(12) United States Patent
Vidal et al.

(10) Patent No.: US 7,075,593 B2
(45) Date of Patent: Jul. 11, 2006

(54) ELECTRON-BEAM-ADDRESSED ACTIVE-MATRIX SPATIAL LIGHT MODULATOR

(75) Inventors: Marcial Vidal, Merritt Island, FL (US); David K. Mutchler, Cocoa Beach, FL (US); Duane A. Haven, Umpqua, OR (US)

(73) Assignee: Video Display Corporation, Tucker, GA (US)

( * ) Notice: Subject to any disclaimer, the term of this patent is extended or adjusted under 35 U.S.C. 154(b) by 0 days.

(21) Appl. No.: 10/811,399

(22) Filed: Mar. 25, 2004

(65) Prior Publication Data

US 2004/0262612 A1    Dec. 30, 2004

Related U.S. Application Data

(60) Provisional application No. 60/457,444, filed on Mar. 26, 2003.

(51) Int. Cl.
*G02F 1/133* (2006.01)

(52) U.S. Cl. .............................. 349/31; 349/33; 349/37; 349/41; 349/54; 257/57; 257/59; 257/72; 257/83; 257/290; 257/461; 257/462

(58) Field of Classification Search ..................... None
See application file for complete search history.

(56) References Cited

U.S. PATENT DOCUMENTS

| | | | | |
|---|---|---|---|---|
| 4,231,068 A | 10/1980 | Hunt | ......................... | 358/252 |
| 4,668,071 A | 5/1987 | Mayer | ........................ | 355/3 R |
| 4,728,174 A | 3/1988 | Grinberg et al. | ............ | 350/344 |
| 4,744,636 A | 5/1988 | Haven et al. | ................ | 350/331 |
| 4,765,717 A | 8/1988 | Buzak et al. | ................ | 350/331 |
| 5,017,991 A * | 5/1991 | Nishizawa et al. | ......... | 257/114 |
| 5,287,215 A | 2/1994 | Warde et al. | ................ | 359/293 |
| 5,379,136 A | 1/1995 | Hu et al. | ........................ | 359/47 |
| 5,471,341 A | 11/1995 | Warde et al. | ................ | 359/293 |
| 5,882,110 A | 3/1999 | Rapisarda | .................... | 362/570 |
| 6,049,370 A | 4/2000 | Smith, Jr. et al. | ........... | 349/156 |
| 6,692,845 B1 * | 2/2004 | Maruyama et al. | ......... | 428/690 |

(Continued)

FOREIGN PATENT DOCUMENTS

WO    WO 00/68732 A1    11/2000

OTHER PUBLICATIONS

Hamann, "Random Access Light Valve Study", AD 628133 Tech. Rpt. RADC-TR-65-451, Jan. 1966.

(Continued)

*Primary Examiner*—Wai-Sing Louie
*Assistant Examiner*—Nathan W. Ha
(74) *Attorney, Agent, or Firm*—Ronald J. Meetin

(57) ABSTRACT

A spatial light modulator contains a substrate (90), a plurality of overlying liquid-crystal cells (202), a plurality of respectively corresponding transistors (204), an electron-beam system (400 and 500), and a control component (203). Each transistor is in electrical communication with the corresponding liquid-crystal cell. The electron-beam system bombards each transistor with electrons that cause it to be selectively in (i) a non-conductive condition in which its channel-region electric field is substantially insufficient for conduction or (ii) a conductive condition in which its channel-region electric field is sufficient for at least partial conduction. During selected time periods when a transistor is in its conductive condition, the control component provides the transistor with a control signal that results in the polarization direction of specified light being selectively rotated in passing through the corresponding liquid-crystal cell.

30 Claims, 21 Drawing Sheets

U.S. PATENT DOCUMENTS 6,785,068 B1 * 8/2004 Takizawa et al. ............ 359/885

OTHER PUBLICATIONS

Haven, "Electron-Beam Addressed Liquid-Crystal Valve", *IEEE Trans. Elec. Devs.*, May 1983, pp. 489-492.

Hornbeck, "Digital Light Processing™ for High Brightness, High-Resolution Applications", Conf. 3013, Projection Displays III, Feb. 10-12, 1997, pp. 1-16, additionally printed at *Procs, SPIE*, vol. 3013, May 1997, pp. 27-40.

Hornbeck, "From cathode rays to digital micromirrors: A history of electronic projection display technology", *IT Tech. J.*, Jul.-Sep. 1998, pp. 7-46.

Koehler/Beran et al., "A Unique Active Contrast-Enhancement Filter Using Liquid-Crystal Pi-Cell Technology," *SID 86 Digest*, 1986, pp. 436-438.

Luxenberg et al., *Display Systems Engineering* (McGraw-Hill Book Co,), 1968, pp. 323-332 and 389-391.

Sekiya et al., "Eye-Trace Integration Effect on The Perception of Moving Pictures and A New Possibility for Reducing Blur on Hold-Type Displays", *SID 02 Digest*, 2002, pp. 930-933.

Sol et al., "Anti-alias", Web Developer's™ Virtual Library, Apr. 1, 1998, 1 p.

* cited by examiner

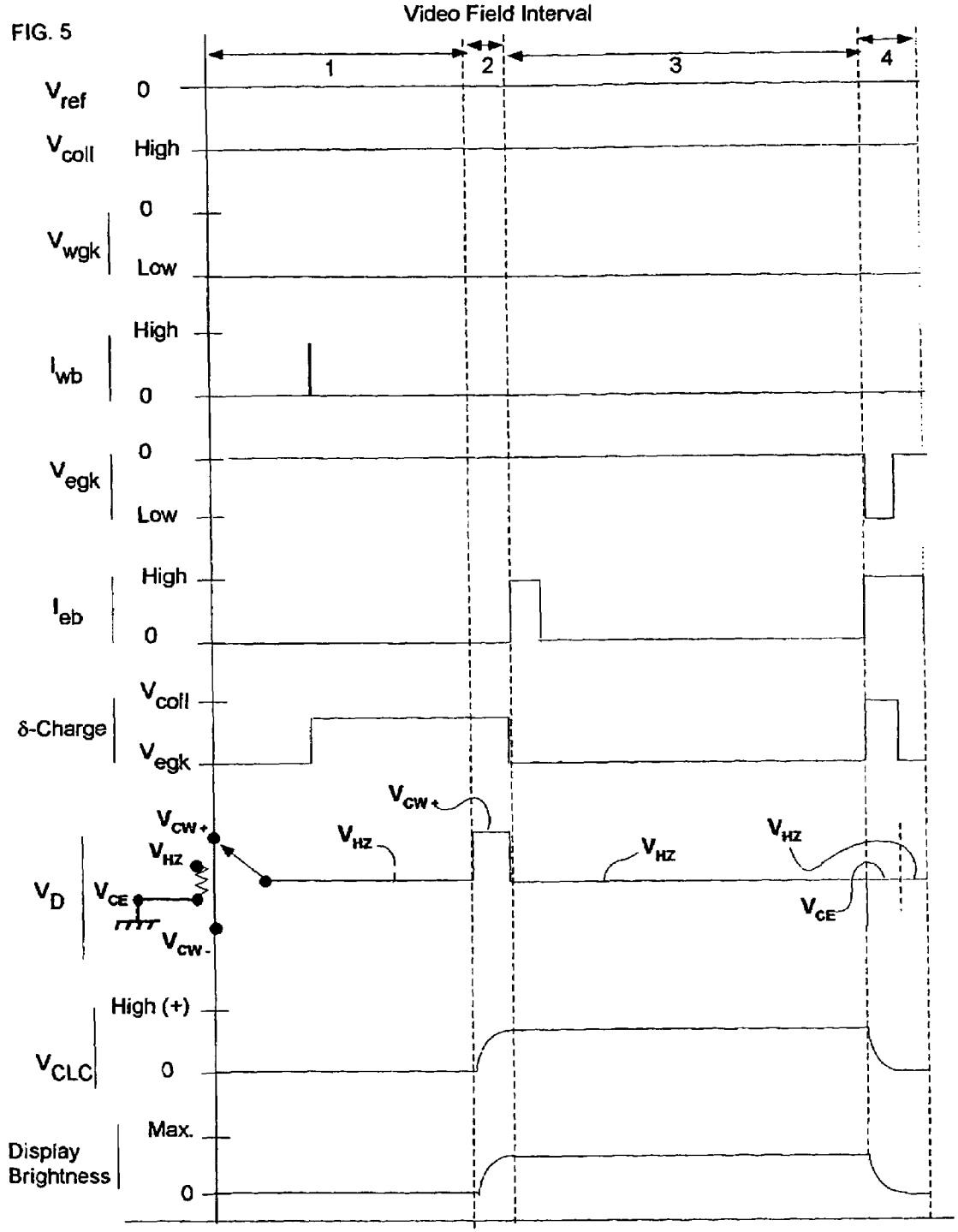

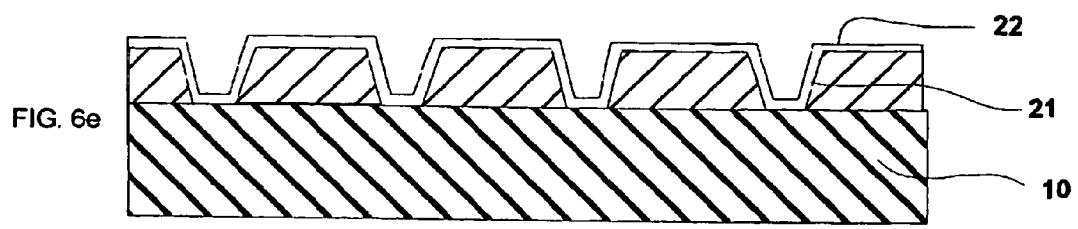
FIG. 6e
FIG. 7
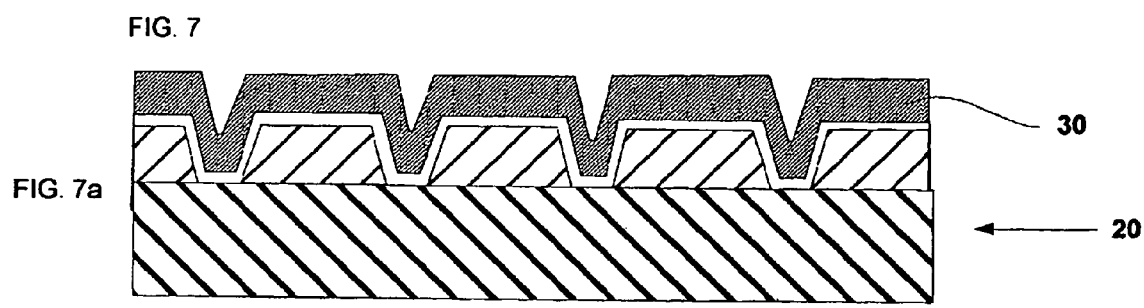
FIG. 7a
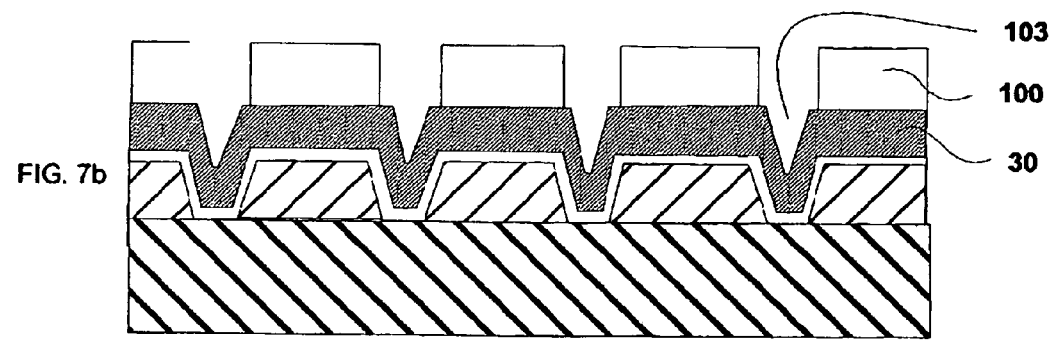
FIG. 7b
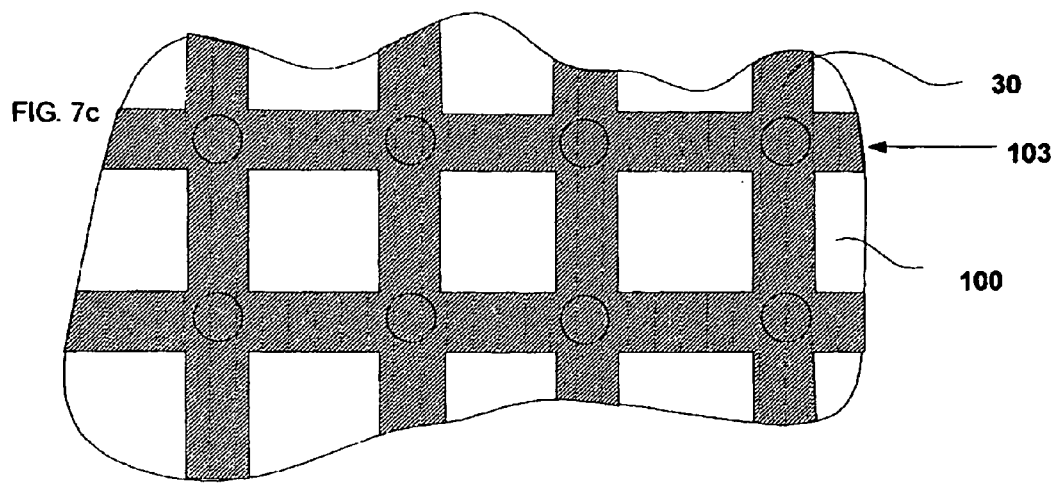
FIG. 7c Ion Implantation

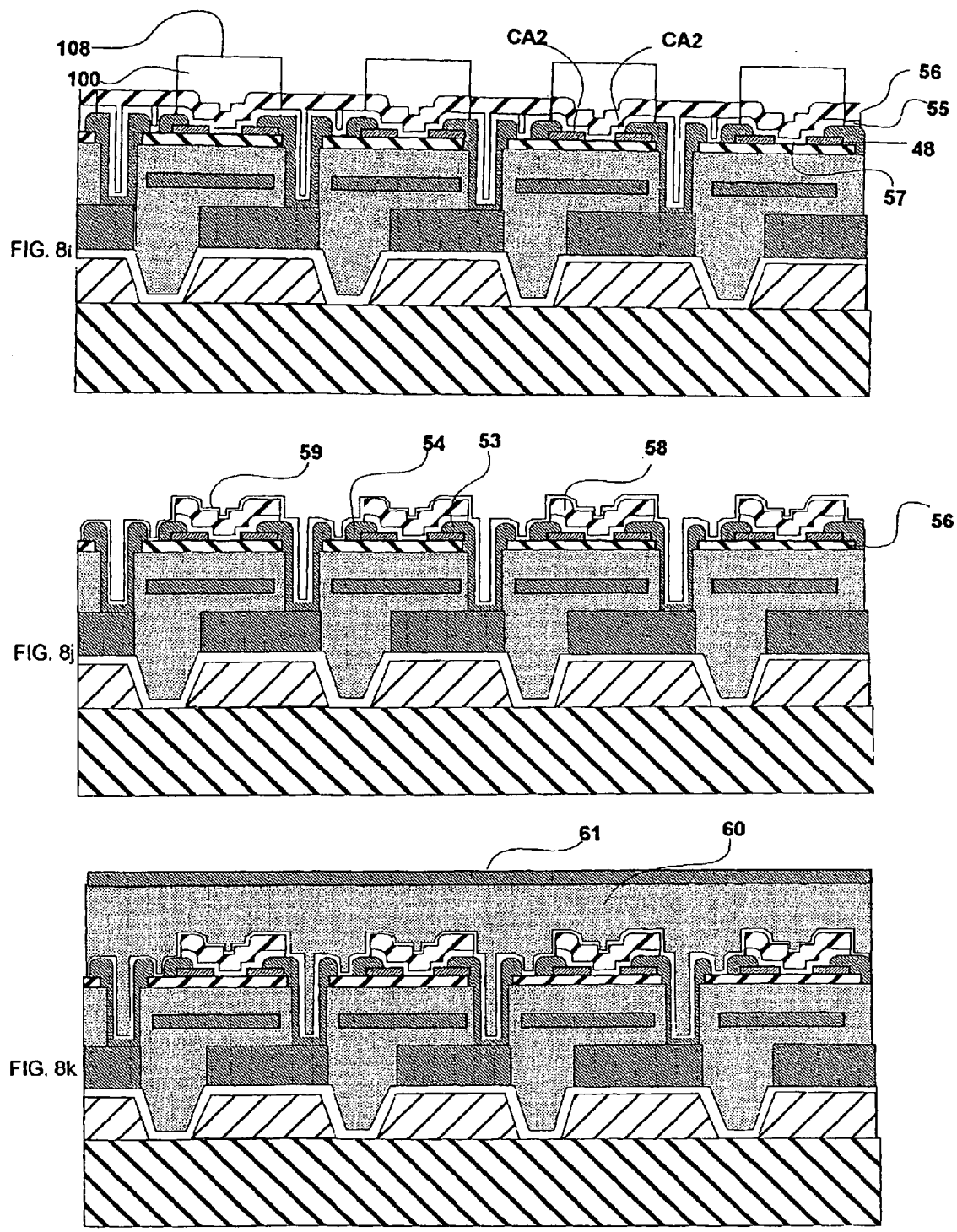

SiOx Evaporated Alignment

ELECTRON-BEAM-ADDRESSED ACTIVE-MATRIX SPATIAL LIGHT MODULATOR

CROSS-REFERENCE TO RELATED APPLICATION

This application claims the priority of, and hereby incorporates by reference, U.S. provisional patent application 60/457,444, filed 26 Mar. 2003.

FIELD OF USE

This invention relates to image presentation and, more particularly, to liquid-crystal image presentation technology.

BACKGROUND OF THE INVENTION

As computer-generated image technology becomes more realistic, the need for projection display systems capable of reproducing images with high fidelity becomes critical. High-fidelity projection display systems are needed in electronic entertainment applications, and are essential in simulation and training where the perceived reality of the environment is central to the purpose of the simulation and training.

An essential feature of image fidelity is the property of image resolution. It is desirable for the spatial resolution of the display to be higher than the resolution of the addressing means so that image quality is not degraded by aliasing artifacts.

Another essential feature of image fidelity is the isolation of image information to the display elements addressed by the addressing means. Capacitive coupling between, and resistive losses in, array bus electrodes conducting electrical signals from the addressing means to the display elements is a contributing factor to degradation of image fidelity by unintended transference of image information to non-addressed display elements and reduction of addressing signal amplitude to addressed display elements.

In the case of a liquid-crystal display, another essential requirement for image fidelity is the maintenance of good color and gray scale by controlling thickness variations in the liquid-crystal film.

RELATED ART

From the early 1950s through the late 1960s, there were a number of attempts to create spatial light modulators addressed by electron beams. This was a natural evolution of the CRT, the major direct-view technology of the time. The first commercially successful projection product that employed electron-beam addressing was the Eidophor light-valve projector, a large continuously pumped system in which the electron beam created a pattern of electric charge in a dielectric oil film. The charge pattern caused a deformation pattern in the oil film whereby the amplitude of the deformation was proportional to the magnitude of the local electric charge. Light from a (xenon) lamp was reflected from the oil film and evaluated by a Schlieren optical system. The magnitude of light passing the Schlieren stop in the optical system, and projected onto a viewing screen, was proportional to the magnitude of the deformation pattern in the oil film.

This same fundamental strategy of using charges deposited on a dielectric to modulate a deformable medium was commercially successful in the General Electric Talaria product line of oil-film light-valve projectors. The Talaria projector was a more portable, less expensive, transmissive version of the Eidophor projector, but still required continuous vacuum pumping because the oil film was exposed to both the electron beam and vacuum. The performance of the Eidophor and Talaria light-valve oil-film projection systems was satisfactory but, even with continuous exhaust, the maintenance and operating cost of the systems was high.

Except for the problems associated with direct oil-film addressing, the oil-film light-valve concept was sufficiently attractive that several development efforts were initiated to isolate the (electron-beam) addressing means from the modulation means. The logical extension of the oil-film projection system was the substitution of the directly written oil film by an electron-beam target in which a matrix of conductive pins, isolated from each other, served as the faceplate of the vacuum tube. An oil film on the non-vacuum side of the pin-matrix faceplate was locally deformed in response to electric charge deposited by an electron beam on the vacuum side of the pin matrix. Light reflected from the oil film was analyzed by an apertured mirror. The resultant deformation pattern was projected onto a viewing screen.

A variation of the pin-matrix system contained a multilayer dielectric mirror suspended over the non-vacuum side of a pin-matrix faceplate. The mirror was deformed at the conductive pins in response to charge deposited by an electron beam. This device functioned optically in a manner similar to that employed in the currently commercially successful Texas Instruments DLP projectors. U.S. Pat. Nos. 5,287,215 and 5,471,341 describe a more modern embodiment of this concept.

The preceding projection systems demonstrated the concept of transferring charge from an addressing means to a modulating means by use of an array of conducting pins in an electrically non-conductive substrate. However, the construction methods and substrate materials fundamentally limited the display resolution. Additionally, an unfavorable aspect ratio resulting from the large substrate thickness compared to the diameter of the feedthrough pins generated capacitive crosstalk between pins. This further reduced display resolution.

An electron-beam-addressed liquid-crystal display developed by Tektronix utilized electron-beam-induced secondary electron emission from a dielectric surface to produce a localized positive charge on a thin dielectric membrane that separated a liquid-crystal film from the vacuum environment. The liquid-crystal film was divided into an array of liquid-crystal cells. Responsive to the electric field induced by the deposited charge, the liquid-crystal cells modulated polarized light to create a projected image. The charge pattern created by a "writing" electron beam remained on the dielectric membrane until removed by an "erase" electron beam.

The Tektronix display successfully demonstrated the basic concept of creating an electric field by means of charge deposited on a dielectric by an electron beam, as well as the mechanism for charge deposition and removal. However, the deposited charge was, necessarily, monopolar. This resulted in unwanted residual DC voltage on the liquid crystal. Commercialization opportunities for the Tektronix display were also limited by the difficulty involved with fabrication of the liquid-crystal cells in a high-vacuum environment.

In each case of recent prior art where the addressing technique utilizes charge deposition by an electron beam and where the display technique employs liquid-crystal modulation resulting from the deposited charge, the mechanism used to transfer information (electrical signals) from the electron-beam target to the display electrodes of the liquid crystal cells has fundamentally limited the resolution of the display. Additionally, the liquid crystal must be isolated from the vacuum environment required for generation of the electron beam.

In a conventional active-matrix liquid-crystal display ("AMLCD"), each pixel contains a thin-film transistor ("TFT"), effectively allowing an unlimited number of pixels to be addressed for image presentation. Each TFT is a three-terminal field-effect device typically formed on a glass or silicon substrate. The TFTs are switched on and off by voltages applied through the (horizontal) scan lines of the array to the TFT gates. The source of each TFT is electrically connected to one of a group of display electrodes and is capacitively coupled through a pixel liquid-crystal cell to a common ground electrode.

The ground electrode is typically formed on a sheet of glass spaced apart from the display electrodes by means of spacer elements disposed between the ground electrode, on one hand, and the display electrodes, on the other hand. Precise control of the electrode spacing is necessary in order to accurately reproduce the character of the input image. Variations in the spacing distance produce optical path differences, leading to non-uniform image gray level and corresponding loss in image quality. The electrode spacing is controlled by dimensional tolerance of the spacing elements and the degree to which the ground and TFT substrates conform to the spacing elements. Although flexibility of the substrates enhances conformal properties, a lack of flatness when the modulator is used in reflective mode can result in reflected image distortion.

Each row in the active matrix is scanned sequentially during a video field. During the time interval when an activation voltage is applied to the gates of all the TFTs in a particular row, data information is applied to each TFT drain (column) electrode in order to charge the associated pixel liquid-crystal cell to a voltage consistent with the gray level of the applied picture information. A driver is required for each row and column. On alternate video fields, the polarity of the data information is inverted, thereby preventing DC offset across the liquid-crystal material.

Each TFT has a low conductance in the off state. This prevents the associated cell capacitor from discharging during the video frame. A row addressed in one frame thus typically remain activated well into the subsequent frame. The overlapping row activation, as well as the typically slow optical response of liquid-crystal material, creates undesirable artifacts in time-varying images.

Additionally, image information is conducted to each TFT in the pixel array by way of bus electrodes that transmit electrical signals from the row and column drivers. These bus electrodes degrade image quality due to resistive losses in each bus electrode between its driver and its pixel TFTs and due to capacitive coupling between each bus electrode and other pixel TFTs in proximity to that bus electrode. Of particular importance are the parasitic capacitance between the gates of the TFTs, on one hand, and their source electrodes, on the other hand. These parasitic capacitances reduce the spatial resolution in conventional AMLCDs because, as the pixel TFTs become smaller, the fixed parasitic capacitances become a larger fraction of the total pixel capacitances.

A need exists for an active matrix light modulator whose spatial resolution is not limited by the parasitic impedance of the addressing electrodes. It is desirable for such a spatial light modulator to avoid undesirable time-varying image artifacts. It is also desirable for the modulator to employ liquid-crystal technology with the spacing and flatness required for image projection without loss of fidelity.

GENERAL DISCLOSURE OF THE INVENTION

An active-matrix light modulator in accordance with the invention contains a substrate, a plurality of liquid-crystal cells overlying the substrate, an active matrix formed with a plurality of transistors respectively corresponding to the liquid-crystal cells, an electron-beam system, and a control component. Each transistor is in electrical communication with the corresponding liquid-crystal cell.

The electron-beam system bombards the transistors with electrons that cause each transistor to be selectively in (i) a non-conductive condition in which that transistor's channel-region electric field is substantially insufficient for conduction or (ii) a conductive condition in which that transistor's channel-region electric field is sufficient for at least partial conduction. Since "conductive condition" is defined here for a transistor with reference to its channel-region electric field, a transistor can be in its conductive condition even though the transistor is not actually conducting current. For instance, one of the current-carrying terminals of a transistor whose channel-region electric field is sufficient to place the transistor in its conductive condition may receive a signal at a high, effectively infinite, impedance so that substantially no current flows through the transistor. Such a transistor is thus disabled.

The liquid-crystal cells overlie the substrate where it is substantially transmissive of specified light which passes through the cells. The specified light, typically visible light such as color light, is polarized and is characterized by a polarization direction that can rotate as the light passes through each liquid-crystal cell. During selected time periods when a transistor is in its conductive condition and not disabled, the control component provides that transistor with a control signal that results in the specified light having its polarization direction selectively rotated in the corresponding liquid-crystal cell. After passing through the liquid-crystal cell, the specified light passes through the substrate and impinges on a suitably located polarization analyzer. Because the polarization direction of the selected light is selectively rotated in the liquid-crystal cell, the intensity of the specified light is selectively altered as it passes through the polarization analyzer so as to present part of an image.

More particularly, the liquid crystal used to form the liquid-crystal cells of the present light modulator normally consists of rod-like molecules oriented such that linearly polarized light is transmitted through the liquid crystal with a polarization direction in accordance with the orientation of the liquid-crystal molecules. The optical axis of the transmitted, polarized light normally corresponds to the long axes of the molecules. When an electric field is applied across a layer of the liquid-crystal material, the orientation of the molecules is a function of the electric field. The molecules are preferably oriented with their long axes roughly orthogonal to the direction of the electric field under the condition of maximum electric field.

Under the influence of the electric field, the long axes of the liquid-crystal molecules rotate. The amount of molecular orientation rotation increases with the strength of the electric field. The polarization direction of the linearly polarized light passing through the liquid-crystal layer varies with the molecular orientation rotation. The rotation of the polarization direction thereby varies from zero when the field strength is zero to a maximum value when the field strength is at its maximum. Upon passing through a suitably located polarization analyzer, the intensity of the transmitted light similarly varies with the amount of field-induced rotation.

The benefits of the present active-matrix light modulator can be seen by examining how the transistors and liquid-crystal cells are operated in accordance with the invention to assist in presenting an image. Starting with all the transistors in their non-conductive conditions, selected ones of the transistors are sequentially bombarded with electrons according to an image pattern at a dosage and average energy that cause each selected transistor to enter its conductive condition. During the sequential electron bombardment of the selected transistors, all of the transistors are disabled. Accordingly, the selected transistors do not yet conduct current even though they are in their conductive conditions. The liquid-crystal cells do not yet start to assist in presenting an image corresponding to the image pattern. The sequential electron bombardment is preferably done with a scanning electron beam of the electron-beam system.

Each selected transistor is subsequently enabled in a writing manner that results in the polarization direction of the specified light being selectively rotated in the corresponding liquid-crystal cell. When there are multiple selected transistors, all of the selected transistors are enabled substantially simultaneously in the writing manner. This results in the polarization directions of the specified light being selectively rotated substantially simultaneously in all of the liquid-crystal cells corresponding to the selected transistors. Using a suitably located polarization analyzer, the combination of the liquid-crystal cells, substrate, and polarization analyzer thereby presents the entire image at substantially the same instant. Operating in this manner enables the active-matrix light modulator of the invention to avoid undesirable time-varying image artifacts.

The current image pattern is preferably erased in preparation for the next image in a sequence of images. At the end of the image-pattern erasure, all of the transistors are again in their non-conductive conditions. The image-pattern erasure normally involves an operation in which all of the transistors are bombarded substantially simultaneously with electrons at a suitable average energy. The simultaneous electron bombardment of all the transistors is preferably done with an additional electron beam of the electron-beam system.

The transistors are normally field-effect devices of the thin-film type. Each such field-effect transistor contains first and second laterally separated source/drain regions, a semiconductor layer, and a gate element. Semiconductor material of the semiconductor layer extends between the source/drain regions. The gate element, which controls the transistor's conductive and non-conductive conditions, is situated at least above the semiconductor material between the source/drain regions. The first source/drain region of each transistor is in electrical communication with the corresponding liquid-crystal cell.

Each field-effect transistor is preferably a virtual-gate transistor in that its gate element consists substantially fully of dielectric material. In particular, the gate element of each transistor is preferably formed with a first gate dielectric layer and an overlying second gate dielectric layer which receives electrons during the electron-bombardment operations. The second gate dielectric layer is capable of storing electrical charge and, upon being bombarded with electrons, of having the amount of stored electrical charged change so as to selectively induce the channel-region electric field for the transistor's conductive or non-conductive condition. This is typically achieved by implementing the second gate dielectric layer with dielectric material having a secondary electron emission coefficient (i) less than 1 when the primary electron energy is below a crossover value and (ii) greater than 1 when the primary electron energy is above the crossover value in a range up to some higher energy value.

Spacer elements are preferably situated between the liquid-crystal cells. The spacer elements provide substantially uniform liquid-crystal cell thickness. This avoids image gray-scale non-uniformities due to changes in optical path length of the modulated light.

A flexible membrane preferably lies between the transistors, on one hand, and the liquid-crystal cells, on the other hand. The membrane improves the hermetic sealing between, and acts as a contamination barrier between, the liquid-crystal cell environment and the vacuum to which the transistors are subjected.

The present active-matrix light modulator operates in a highly efficient manner. In addition to avoiding undesirable image artifacts, the modulator's spatial resolution is largely not limited by parasitic impedances of addressing electrodes. The image is highly uniform. The operating life is long due to the elimination of liquid-crystal degradation caused by residual DC voltage across image-carrying cells of prior electron-beam-addressed light modulators.

Two factors enable the AMLCD spatial resolution to be very high in the light modulator of the invention. Firstly, bus electrodes and the associated bus-electrode area are not needed in the present light modulator. Secondly, the interval time for transferring (writing) each image pattern can be comparatively long, thereby allowing the capacitors that incorporate the liquid-crystal cells sufficient time to fully charge to the desired values. The transistors can be made quite small. Aliasing artifacts due to active-matrix array spatial resolution being less than addressing resolution are reduced in the present light modulator. The present invention thus provides a large advance over the prior art.

BRIEF DESCRIPTION OF THE DRAWINGS

FIG. 1b is a circuit diagram of the light modulator, including control component, of FIG. 1a.

FIG. 5 is a timing diagram for typical operation of the light modulator of FIGS. 1a and 1b.

FIGS. 6a–6c and 6e are cross-sectional side views representing steps in fabricating a mandrel substrate for use in manufacturing the light modulator of FIG. 1a.

FIGS. 7a, 7b, 7d, and 7f–7j are cross-sectional side views representing initial steps in a process for manufacturing the light modulator of FIG. 1a in accordance with the invention utilizing the mandrel substrate fabricated according to the process of FIGS. 6a–6e.

FIGS. 7c and 7e are plan views of the respective intermediate structures of FIGS. 7b and 7d.

FIGS. 7a–7k specifically illustrate formation of the display electrodes and thin flexible membrane.

FIGS. 8a–8m are cross-sectional side views representing further steps, starting from the stage of FIG. 7j, in the process for manufacturing the light modulator of FIG. 1a according to the invention.

FIGS. 8a–8m specifically illustrate formation of the active-matrix thin-film transistors.

FIG. 9b is a side, partial cross-sectional view that shows how a roller is utilized at the stage of FIG. 9a.

FIGS. 9a–9d specifically illustrate release of the mandrel substrate.

FIGS. 10 and 12 are plan views.

FIGS. 11 and 13 are cross-sectional side views.

FIGS. 10–13 illustrate formation of the liquid-crystal cells and installment of the modulator substrate.

Like reference symbols are used in the drawings and in the description of the preferred embodiments to represent the same, or very similar, item or items.

DESCRIPTION OF THE PREFERRED EMBODIMENTS

The present invention furnishes a reflective liquid-crystal light modulator addressed by an array of thin-film transistors, wherein each display element has electrical and mechanical isolation from adjacent and proximate display elements. Image information is provided to the active array by means of a scanning electron beam.

Figure 1A:
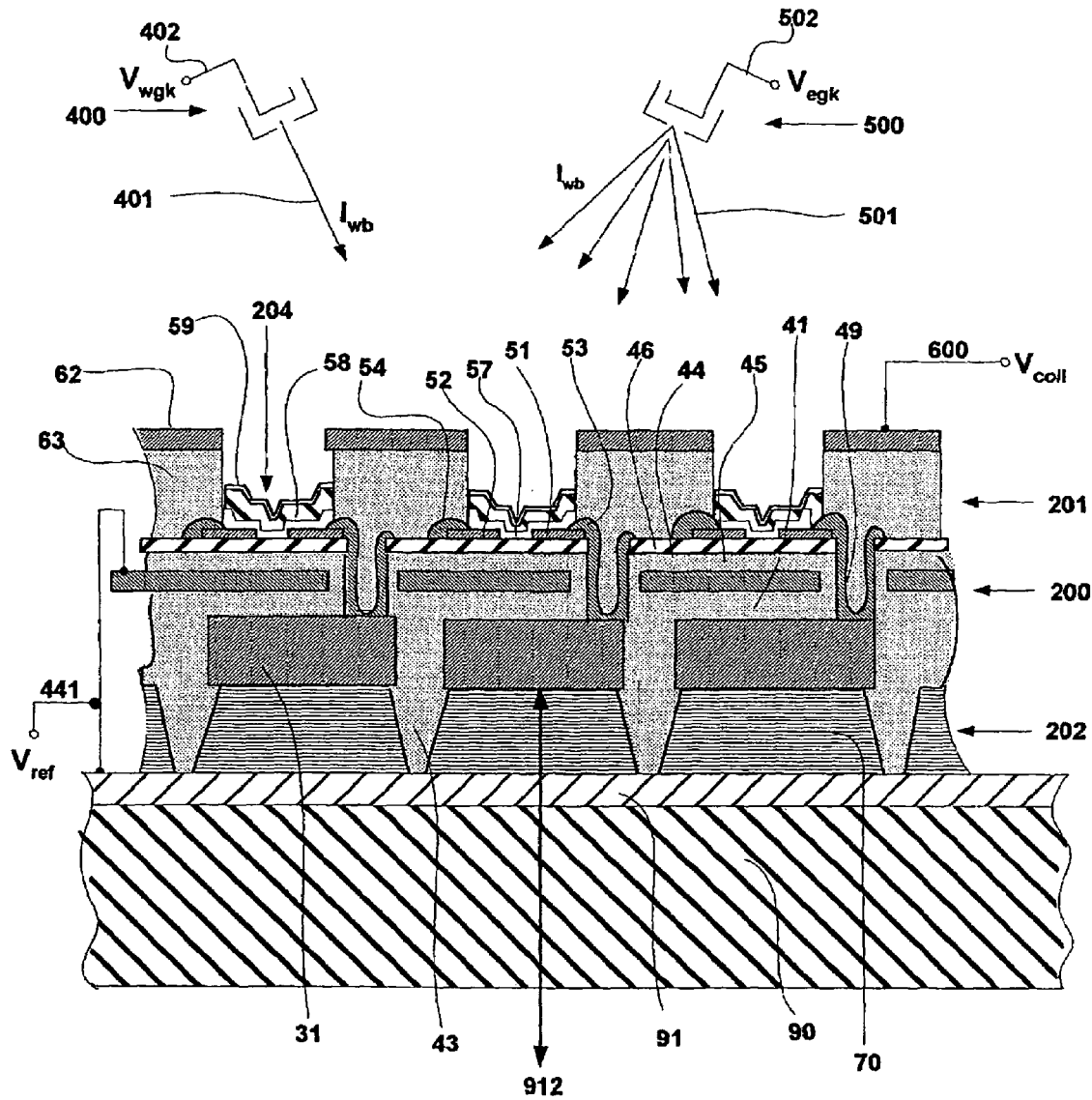
FIG. 1a is a cross-sectional side view of an electron-beam-addressed active-matrix spatial light modulator, including electron-beam system, in accordance with the invention.
Figure 1B:
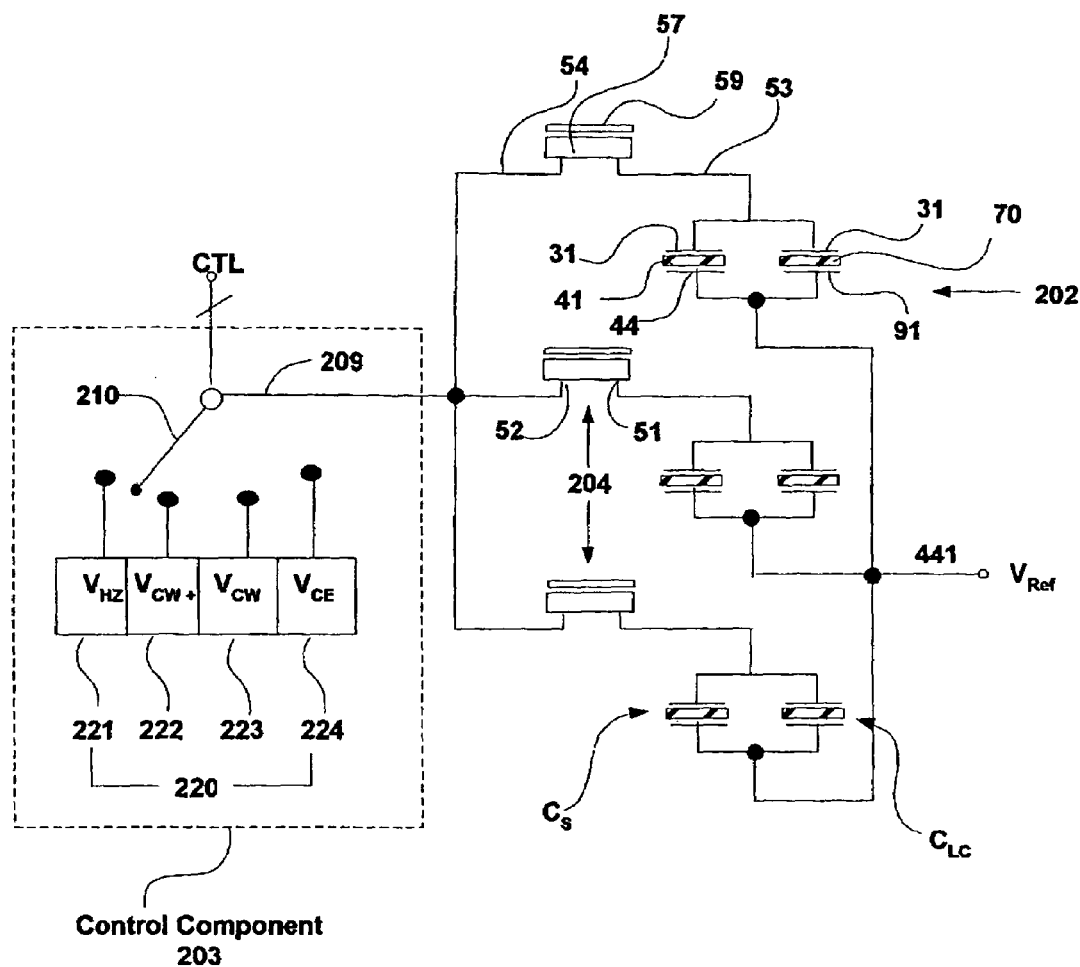

Referring to the drawings, FIGS. 1a and 1b (collectively "FIG. 1") together illustrate a reflective liquid-crystal light modulator in accordance with the invention. The light modulator of FIG. 1 includes a thin flexible membrane 200, an active matrix 201 disposed along one side (the upper side in FIG. 1a) of membrane 200, a two-dimensional array of display electrodes 31 disposed along the other side (the lower side in FIG. 1a) of membrane 200, electrically conductive means 49 for electrical communication between active matrix 201 and display electrodes 31, a layer 70 of liquid crystal divided into a two-dimensional array of liquid-crystal cells 202 respectively corresponding to display electrodes 31, an electrically insulating transparent modulator substrate 90, a common transparent electrode 91 situated on substrate 90, a control component 203, and an electron-beam system formed with a writing electron gun 400 and an erasing electron gun 500. Writing electron gun 400 generates a scanning electron beam 401 for addressing active matrix 201. Erase electron gun 500 generates an electron beam 501 for use in flood erasing matrix 201.

Components 90, 91, 200, 201, and 202 form a light-modulator structure. A hermetically sealed vacuum envelope (not shown), including a transparent faceplate (also not shown), encloses the modulator structure and electron guns 400 and 500. Means for providing appropriate electrical signals to the components inside the vacuum envelope are situated outside the vacuum envelope. A pressure typically in the vicinity of $10^{-6}$ torr is present inside the vacuum envelope. Flexible membrane 200 provides a seal barrier between active matrix 201 and liquid-crystal cells 202.

Liquid-crystal layer 70 lies between display electrodes 31, on one hand, and common electrode 91, on the other hand. Electrically insulating spacers 43 laterally separate liquid-crystal cells 202 from one another in layer 70. Spacers 43 also provide a uniform spacing between common electrode 91 and display electrodes 31. This enables the thickness of liquid-crystal layer 70 to be highly uniform, thereby substantially avoiding gray-scale non-uniformities that could otherwise arise from changes in the optical path length of the modulated light.

Active matrix 201 contains a two-dimensional array of two-terminal thin-film field-effect transistors 204 respectively corresponding to liquid-crystal cells 202. Each thin-film transistor ("TFT") 204 is a virtual-gate device consisting of a pair of laterally separated source/drain regions (or pads) 51 and 52, a pair of source/drain electrodes 53 and 54 respectively contacting source/drain regions 51 and 52, a semiconductor layer 57 extending between and partially over source/drain regions 51 and 52, and a virtual gate element formed with a first gate dielectric layer 58 and a second gate dielectric layer 59 referred to here as a delta coating. First gate dielectric layer 58 lies on semiconductor layer 57, including the semiconductor material extending between source/drain regions 51 and 52. Delta coating 59 is situated on gate dielectric layer 58.

Source/drain regions 51 and 52 variously function as source and drain during light-modulator operation. For convenience, source/drain region 51 is sometimes referred to below as "source region" (or simply "source") 51, and source/drain region 52 is sometimes referred to below as "drain region" (or simply "drain") 51. Similarly, source/drain electrodes 53 and 54 are sometimes referred to below respectively as source electrode 53 and drain electrode 54.

Figure 2:
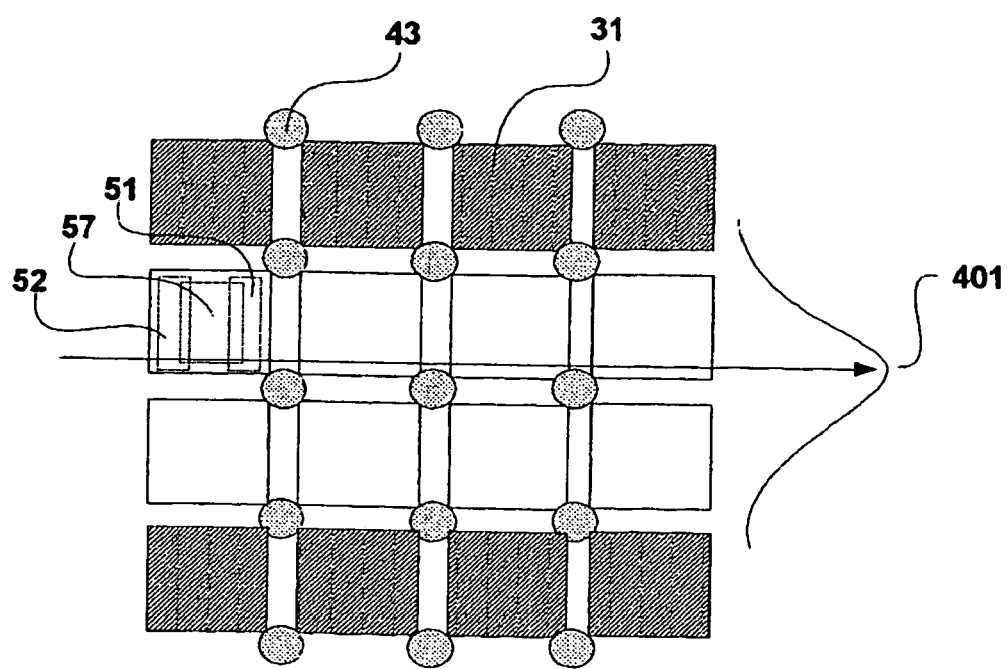
FIG. 2 is a plan view of sixteen subpixels, where four subpixels in a square form a pixel in the light modulator of FIGS. 1a and 1b.

The combination of each TFT 204, corresponding underlying display electrode 31, corresponding underlying liquid-crystal cell 202, and the underlying parts of common electrode 91 and substrate 90 constitute a subpixel. Each pixel of the light modulator of FIG. 1 is formed with four subpixels arranged laterally in a square as shown in FIG. 2. As addressing electron beam 401 sequentially scans the light-modulator array, four TFTs 204 thus receive the image information conveyed by electron beam 401 in modulating one pixel. This characteristic of the light modulator of FIG. 1 improves image quality by minimizing stair-stepping and blocky appearances of images containing diagonal lines and features.

More particularly, the light-modulator structure of FIG. 1 is allocated into a two-dimensional array of rows and columns of pixels as indicated in FIG. 2. The subpixels in each pixel are similarly arranged in a two-dimensional subarray of rows and columns. The subpixels have an average subpixel width in a first lateral direction, e.g., the vertical direction in FIG. 2. The average subpixel width in the first lateral direction is typically the average width of TFTs 204, specifically their gate elements (described further below), in the first lateral direction.

As described below, electron beam 401 of writing electron gun 401 scans TFTs 204 during transistor writing operations. In scanning TFTs 204 in a second lateral direction, e.g., the horizontal direction in FIG. 2, generally perpendicular to the first lateral direction, beam 401 has a beam width in the first lateral direction. As indicated below in connection with FIG. 4, beam 401 provides electrons having a generally Gaussian spatial distribution perpendicular to the direction of beam travel. Based on this Gaussian electron distribution, the beam width is the Gaussian distribution width at which the electron current density in beam 401 is one half (50%) of the maximum electron current density in beam 401. The Gaussian-shaped curve at the right-hand side of FIG. 2 indicates the Gaussian electron distribution as beam 401 moves in the second lateral direction, the horizontal direction in FIG. 2, over TFTs 204.

The beam width is normally approximately, at least, the average pixel width in the first lateral direction and, in the case of FIG. 2 where each pixel has two subpixels in line with each other in the first lateral direction, twice the average subpixel width in the first lateral direction. Twice the subpixel width is defined as the lateral dimension between the centers of the two transistor gate elements (pitch) in a lateral direction plus the lateral width dimension of the transistor gate element in the same lateral direction. When the transistor gate-element dimension is not the same for the first and second lateral directions, the average pixel width is the greater of the two dimensions. For the more general case in which a pixel contains two or more subpixels in line with one another in the first lateral direction, the beam width is at least twice the pixel width. Where a pixel contains three or more subpixels in line with one another in the first lateral direction, the beam width is not less than three times the average subpixel width. Hence beam 401 scans along a line whose width is at least twice the average subpixel width and thus at least twice the average transistor width.

Distortion of a continuous line due to the nature of a screen display is termed aliasing. Taking note of the fact that anti-aliasing consists of smoothening rough, jagged edges of curved and diagonal lines as specified in Sol et al., "Anti-alias", Web Developer's™ Virtual Library, 1 Apr. 1998, p. 1, the use of subpixels in the light modulator of FIG. 1 combined with scanning the subpixels in the foregoing manner provides anti-aliasing.

Source/drain regions 51 and 52 of each TFT 204 consist of heavily doped n-type amorphous semiconductor material, preferably silicon. Semiconductor layer 57 consists of substantially intrinsic (undoped) semiconductor material, likewise preferably silicon. Source/drain electrodes 53 and 54 are formed with metal, typically chromium. Gate dielectric layer 58 of each TFT 58 is typically silicon nitride ($Si_3N_4$) but can be formed with other electrical insulators such as silicon oxide ($SiO_2$). Delta coating 59 of each TFT 204 consists, as discussed further below, of dielectric material which emits low-energy secondary electrons at a relatively high areal emission rate when impacted by primary electrons of sufficient kinetic energy. For example, delta coatings 59 are typically formed with magnesium oxide (MgO).

The light modulator of FIG. 1 modulates visible light, typically color light. For operation in a light-reflective mode with color light, the modulator can be typically provided with an appropriate color filter. The modulated visible light can be white light.

Figure 4:
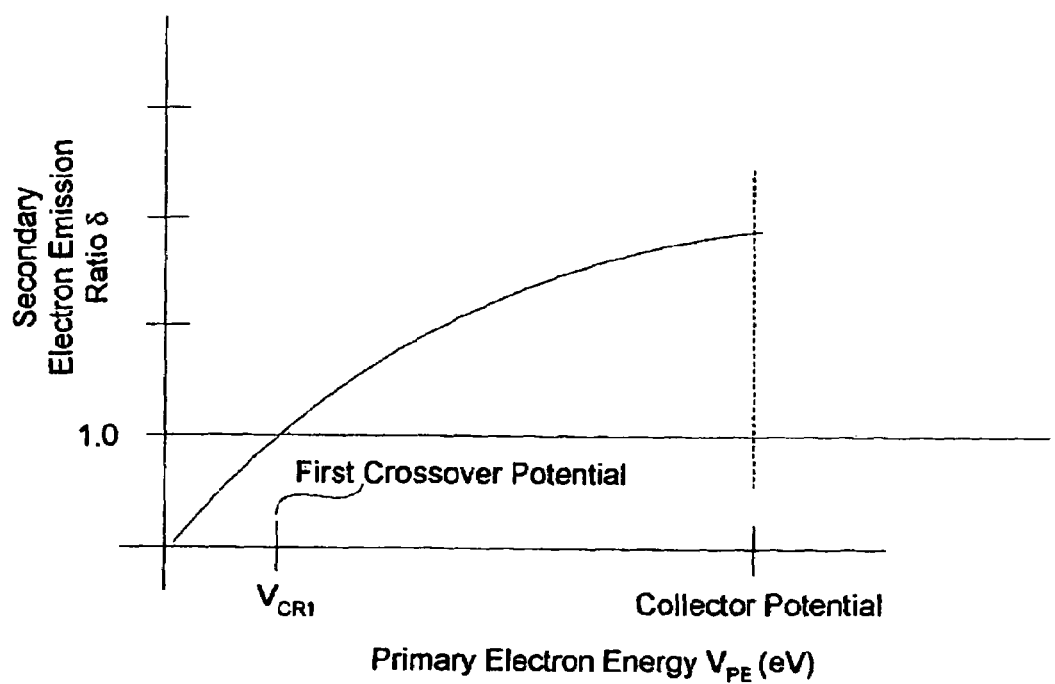
FIG. 4 is a graph of secondary electron emission coefficient as a function of primary electron energy for the dielectric material of the delta coatings of the gate elements of the active-matrix transistors in the light modulator of FIGS. 1a and 1b.

Data information is applied to the gate element of each TFT 204 in order to vary the source-drain current $I_{SD}$ through that TFT 204. Source-drain current (or simply source current) $I_{SD}$ is a function of gate voltage $V_D$ as shown in FIG. 4. For typical TFT geometry, there is a region in which source current $I_{SD}$ varies fairly linearly (on a logarithmic scale) with gate voltage $V_G$. The operating TFT range is the gate-voltage range between the threshold voltage $V_{th}$ at which TFTs 204 turn on (start to conduct current) and the voltage $V_{sat}$ at which TFTs 204 saturate.

The number of secondary electrons emitted from each delta coating 59 as a ratio of secondary electrons to incident primary electrons increases with increasing energy (electron volts) of the primary electrons. Since the kinetic energy of secondary electrons is very low, many secondary electrons return to a delta coating 59 unless there is a strong electric field adjacent the emitting surface to accelerate emitted electrons away from the emitting surface. If the average primary-electron energy is sufficiently high that the number of secondary electrons emitted by a delta coating 59 exceeds the total number of primary and secondary electrons collected by that coating 59, a positive charge is produced on that coating 59. Conversely, a negative charge is produced on a delta coating 59 if the average primary-electron energy is sufficiently low that the total number of primary and secondary electrons collected by that coating 59 exceeds the number of secondary electrons emitted by that coating 59. The polarity of charge on each delta coating 59 is thus controlled by controlling the average energy of the primary electrons.

When a subpixel is being addressed for a writing operation, a positive charge is induced on that subpixel's delta coating 59 by supplying primary electrons at a relatively high average energy from electron beam 401 of writing electron gun 400. In simultaneously erasing all of the subpixels, negative charges are induced on all of delta coatings 59 by furnishing primary electrons at a relatively low average energy from electron beam 501 of erasing electron gun 500. The energy of electron beam 401 or 501 can be approximated by the difference between the potential of the primary electrons emitted from the electron gun cathode and the potential of a delta-coating surface at which the electrons impact.

FIG. 4 illustrates how the secondary electron emission coefficient δ, i.e., the ratio of emitted secondary electrons to collected primary and secondary electrons, varies with the average energy $V_{PE}$ of primary electrons that impact a surface formed with the dielectric material of delta coatings 59. As shown in FIG. 4, there are two potentials at which a delta-coating surface stabilizes. When the average primary-electron energy $V_{PE}$ is low, i.e., less than a crossover value $V_{CR1}$ below which coefficient δ is less than 1, the surface collects primary and secondary electrons until the surface potential is approximately the same as the electron-gun cathode potential. When the average primary-electron energy $V_{PE}$ is sufficiently high, i.e., greater than $V_{CR1}$ at a value in the range (extending to some higher value) where coefficient δ is greater than 1, and the collection field adjacent the surface is sufficient to collect most of the emitted secondary electrons, the surface charges to the potential of the adjacent collector. If the dosage (number) of electrons furnished by the electron beam is insufficient, either because the electron beam current is low or/and the time during which the electron beam dwells on delta coating 59 is short, coating 59 charges toward one of the two stable potentials. The time that a scanning electron beam dwells on any location is typically determined by the preferred video rate and number of pixels in the display. The variable current in the electron beam therefore determines the variable charge on delta coating 59.

Each TFT 204 has a channel region consisting of the semiconductor material situated between source/drain regions 51 and 52. The electric field in the channel region of each TFT 204 varies with the amount of electrical charge on that TFT's delta layer 59. Each TFT 204 is in a non-conductive condition when its channel-region electric field is substantially insufficient for (current) conduction. This arises when delta coating 59 of that TFT 204 is negatively charged or is positively charged below a threshold level necessary for current to flow through that TFT's channel region.

Figure 3:
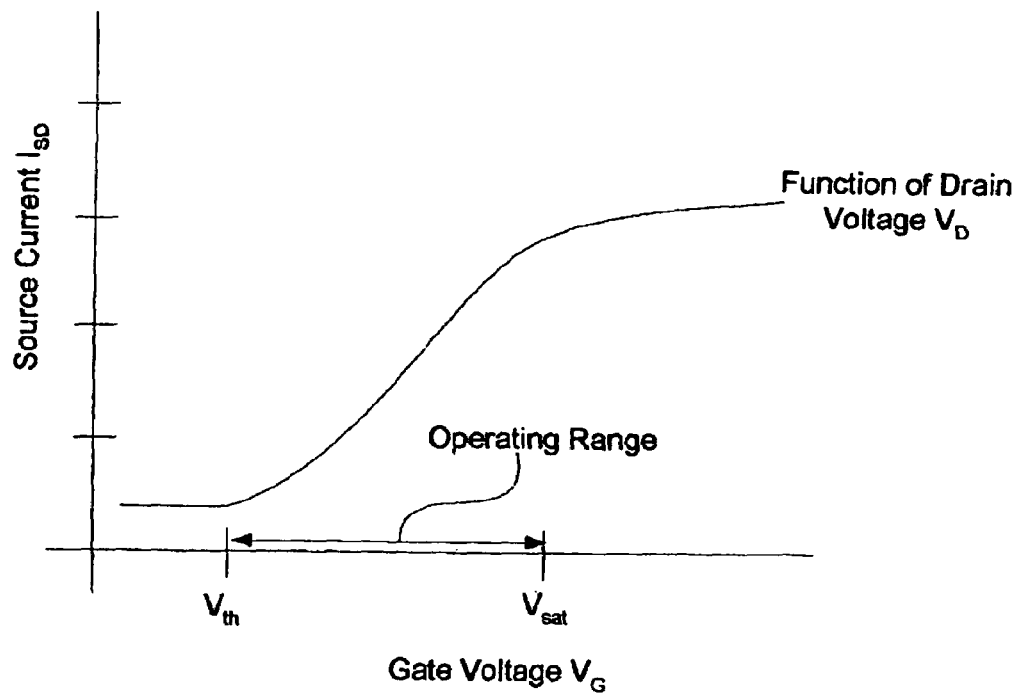
FIG. 3 is a graph of source-drain current as a function of gate voltage for a field-effect transistor in the active matrix of the light modulator of FIGS. 1a and 1b.

When delta coating 59 of a TFT 204 is positively charged to at least the threshold level, the channel-region electric field for that TFT 204 becomes sufficiently high for it to conduct current via a carrier channel extending along the top of the semiconductor material between source/drain regions 51 and 52. The amount of current which can flow through the channel increases with increasing positive charge on delta coating 59 up to a saturation level as indicated in FIG. 3. Each TFT 204 is thus in a conductive condition when its channel-region electric field is sufficient for at least partial (current) conduction. The conductive conduction for each TFT 204 varies between (a) a low-field condition in which its channel-region electric field is just sufficient for conduction to occur and (b) a high-field condition at which its channel-region electric field is highest depending on various physical and operational parameters so that a maximum amount of current can flow through that TFT 204.

Delta coatings 59 of selected ones of TFTs 204 are provided with selected amounts of positive charge in accordance with an image pattern during a transistor writing operation by sequentially bombarding coatings 59 of those selected TFTs 204 with electrons from scanning electron beam 401 of writing electron gun 400 at an electron dosage and average electron energy $V_{PE}$ suitable for placing each selected TFT 204 in its conductive condition at a selected level ranging from its low-field condition to its high-field condition. Average electron energy $V_{PE}$ during the transistor writing operation is greater than crossover value $V_{CR1}$ and at a suitable point in the range where secondary electron emission coefficient δ exceeds 1. The electron dosage provided to delta coating 59 of each selected TFT 204 depends on the electron-beam current and dwell time during which electrons from electron beam 401 bombard that coating 59. The dwell time is typically the same for coatings 59 of all selected TFTs 204. Accordingly, the electron dosage is controlled from selected TFT 204 to selected TFT 204 by appropriately controlling the electron-beam current for each selected TFT 204. Subsequent to the transistor writing operation, a writing operation (described further below) is performed on liquid-crystal cells 202 corresponding to selected TFTs 204 for charging the capacitors that incorporate those cells 202 in accordance with the image pattern of selected TFTs 204.

As described further below, a transistor erase operation preferably consists of (a) an initial part in which each selected TFT 204 is returned to its non-conductive condition, (b) an intermediate part in which all of TFTs 204 are simultaneously placed in their conductive conditions, normally at their high-field conditions, for simultaneously discharging all of liquid-crystal cells 202, and (c) a final part in which all of TFTs 204 are simultaneously returned to their non-conductive conditions. The three parts of the transistor erase operation are performed with erase electron gun 500.

During the initial part of the transistor erase operation, electron beam 501 is directed substantially simultaneously toward delta coatings 59 of all TFTs 204 in a flood manner. Because delta coatings 59 of selected TFTs 204 were charged positively during a transistor writing operation to a level at or in excess of the threshold level while coatings 59 of the remaining (unselected) TFTs 204 are normally charged to a common-plane reference potential $V_{ref}$ typically at 0 V and, in any case, are not charged to at least the threshold level, electrons from electron beam 501 largely only strike coatings 59 of selected TFTs 204 during the initial part of the transistor erase. In particular, delta coatings 59 of selected TFTs 204 are simultaneously bombarded with electrons from beam 501 at an electron dosage and average electron energy suitable for returning all of selected TFTs to their non-conductive conditions. Average electron energy $V_{PE}$ is less than crossover value $V_{CR1}$ and at a value in the range where secondary electron emission coefficient δ is below 1. The dosage during the initial part of the transistor erase depends on the electron-beam current and dwell time during which electrons from beam 501 simultaneously bombard coatings 59 of selected TFTs 204. The electron-beam current is set at a value sufficiently high to ensure that any selected TFT 204 in its high-field condition returns to its non-conductive condition. All of TFTs 204 are in their non-conductive conditions at the end of the initial part of the transistor erase.

The intermediate part of the transistor erase operation consists of simultaneously bombarding delta coatings 59 of all TFTs 204 with electrons from electron beam 501 at an electron dosage and average electron energy suitable for placing all of TFTs 204 in their conductive conditions, again normally their high-field conditions. Average electron energy $V_{PE}$ for the intermediate part of the transistor erase is greater than crossover value $V_{CE1}$ and at a suitable location in the range where secondary electron emission coefficient δ exceeds 1. The dosage is controlled by appropriately choosing the electron-beam current. Subsequent to the transistor erase operation, an erase operation (described further below) is performed to simultaneously discharge the capacitors that incorporate all of liquid-crystal cells 202.

The final part of the transistor erase operation consists of simultaneously bombarding delta coatings 59 of all TFTs 204 with electrons from electron beam 501 at an electron dosage and average electron energy suitable for placing all of TFTs 204 in their non-conductive conditions. Average electron energy $V_{PE}$ for the final part of the transistor erase is less than crossover value $V_{CE1}$ and at a suitable value where secondary electron emission coefficient δ is below 1. The dosage is controlled by appropriately choosing the electron-beam current. TFTs 204 are now ready for another transistor writing operation.

Conductive means 49 which provides electrical communication between active matrix 201 and display electrodes 31 consists of TFT source electrodes 53. In particular, each display electrode 31 is electrically connected to corresponding TFT 204 via its source electrode 53 that carries source/drain current $I_{SD}$ at a source voltage $V_S$. Each display electrode 31 is situated on corresponding liquid-crystal cell 202. Consequently, each TFT 204 electrically communicates with corresponding liquid-crystal cell 202 by way of the combination of corresponding display electrode 31 and that TFT's source electrode 53.

Drain electrodes 54 of all TFTs 204 are electrically connected together to receive a common drain voltage $V_D$ from control component 203 on a line 209 as shown in FIG. 1b. Control component 203 consists of a switch 210 and a composite reference-voltage/high-impedance source 220 formed with a high-impedance section 221 and three reference-voltage sections 222, 223, and 224. High-impedance section 221 provides a high-impedance signal $V_{HZ}$ at a voltage typically equal to 0 V (ground reference). Reference-voltage section 222 supplies a low-impedance high-positive cell-writing voltage $V_{CW+}$. Reference-voltage section 223 supplies a low-impedance high-negative cell-writing voltage $V_{CW-}$. Reference-voltage section 224 supplies a low-impedance low cell-erase voltage $V_{CE}$ at a value normally approximately midway between the $V_{CW+}$ and $V_{CW-}$ values. In a typical embodiment of the light modulator of FIG. 1, writing voltage $V_{CW+}$ is +5 V, erase voltage $V_{CE}$ is 0 V, and writing voltage $V_{CW-}$ is −5 V.

Responsive to control signals CTL, switch 210 electrically connects line 209 to one of reference-voltage/high-impedance sections 221–224. Drain electrodes 54 of TFTs 204 therefore all simultaneously receive drain voltage $V_D$ at (a) high-positive writing value $V_{CW+}$ during certain time periods, (b) erase value $V_{CE}$ during other time periods, and (c) high-negative writing value $V_{CW-}$ during yet other time periods. As discussed further below, drain voltage $V_D$ is supplied at erase value $V_{CE}$ for simultaneously erasing all of liquid-crystal cells 202 during the erase portion of every image data field. Drain voltage $V_D$ is supplied at high-positive writing value $V_{CW+}$ for simultaneously writing selected ones of cells 202 during every other image data field, and at high-negative writing value $V_{CW-}$ for simultaneously writing selected ones of cells 202 during each remaining alternate image data field so that the average DC voltage across cell 202 is approximately zero. This prevents liquid-crystal cells 202 from incurring undesirable DC offset.

Drain electrodes 54 of TFTs 204 also simultaneously receive drain voltage $V_D$ at high-impedance value $V_{HZ}$ during further time periods referred to here as disablement time periods or intervals. The impedance that characterizes high-impedance voltage $V_{HZ}$ is very high, effectively infinite. Connecting drain electrodes 54 through line 209 and switch 210 to receive high-impedance signal $V_{HZ}$ therefore effectively open circuits all of TFTs 204 regardless of whether each TFT 204 is in its conductive or non-conductive condition. As a result, all of TFTs 204 are disabled, i.e., do not significantly conduct current, when switch 210 connects line 209 to the $V_{HZ}$ position.

Each liquid-crystal cell 202 extends between corresponding display electrode 31 and common electrode 91 situated on substrate 90. Common electrode 91 is connected to an electrical line 441 that receives common-plane reference voltage $V_{ref}$, again typically 0 V. Liquid-crystal cells 202 preferably consist of nematic liquid crystal with negative dielectric anisotropicity. Common electrode 91 consists of indium tin oxide ("ITO"). Substrate 90, which forms the faceplate for the light modulator of FIG. 1, consists of glass.

The light modulator of FIG. 1 operates in a reflective mode with display electrodes 31 being light reflective at least along their flat liquid-crystal-contacting surfaces (lower surfaces in FIG. 1a). Double-headed arrow 912 in FIG. 1a indicates linearly polarized visible light that impinges on the front surface (lower surface in FIG. 1a) of substrate 90 at the front of the light modulator, passes through substrate 90 and common electrode 91, passes through a liquid-crystal cell 202 where the light's polarization direction may undergo rotation depending on liquid-crystal voltage $V_{LC}$ (not indicated in FIG. 1a) across that cell 202, is reflected off the liquid-crystal-contacting surface of corresponding display electrode 31, passes back through that cell 202 where the light's polarization direction may undergo further rotation, and passes back through common electrode 91 and substrate 90 and out the front of the light modulator.

Voltage $V_{LC}$ across a liquid-crystal cell 202 is a function of the amount of charge provided through corresponding TFT 204 to corresponding display electrode 31 during cell writing operations (described further below). Each liquid-crystal voltage $V_{LC}$ varies from approximately 0V to $V_{CW+}$−$V_{CE}$ (or $V_{CE}$−$V_{CW+}$), typically 5 V. The polarization direction of the plane polarized visible light passing twice through a cell 202, once on incidence and the second time on reflection, undergoes largely no rotation when voltage $V_{LC}$ for that cell is zero. When voltage $V_{LC}$ is at its maximum, the polarization direction undergoes a maximum rotation. Each liquid-crystal cell 202 thus operates from (i) a low-rotation condition in which the polarization direction of the light passing through that cell 202 rotates a first amount as little as zero to (ii) a high-rotation condition in which the polarization direction of the light passing through that cell 202 rotates a second amount greater than the first amount. The maximum rotation of the polarization direction on each passage through a cell 202 is typically 45° for a total maximum rotation of 90°.

Each liquid-crystal cell 202 in combination with display electrode 31 and the underlying part of common electrode 91 forms a liquid-crystal capacitor $C_{LC}$ as shown schematically in FIG. 1b. The particular cells 202 which correspond to selected TFTs 204 placed in their conductive conditions in accordance with the image pattern are referred to here as selected liquid-crystal cells 202. The combination of a selected liquid-crystal cell 202, corresponding display electrode 31, and the underlying part of common electrode 91 is then referred to as a selected liquid-crystal cell capacitor $C_{LC}$.

A storage capacitor $C_S$ is formed with each display electrode 31, the overlying part of a storage capacitor dielectric layer 41 of insulating polymer, and the further overlying part of ground plane 44 as also shown in FIG. 1a. Each storage capacitor $C_S$ corresponds to, and is connected electrically in parallel with, one of liquid-crystal capacitors $C_{LC}$. Storage capacitors $C_S$ provides additional storage capacity for liquid-crystal capacitors $C_{LC}$ so that minor charge leakage from cell capacitors $C_{LC}$, caused by possible fabrication defects, is compensated for by reserve charge in storage capacitors $C_S$. This ensures that desired image gray level is maintained.

During a cell writing operation (performed after a transistor writing operation), all of selected liquid-crystal capacitors $C_{LC}$ and corresponding storage capacitors $C_S$ are charged by respectively providing currents $I_{SD}$ through source electrodes 53 of selected TFTs 204 to selected cell capacitors $C_{LC}$ and corresponding storage capacitors $C_S$ for a specified time period. The charge provided to each selected liquid-crystal capacitor $C_{LC}$ and corresponding storage capacitor $C_S$ depends on the magnitude and time duration of current $I_{SD}$ flowing through corresponding selected TFT 204.

Selected TFTs 204 are, during the cell writing operation, in their conductive conditions at selected points varying from the low-field condition to the high-field condition in accordance with the image pattern. Drain voltage $V_D$ is provided to drain electrodes 54 of all TFTs 204, including selected TFTs 204, at the same value $V_{CW+}$ or $V_{CW-}$ during the cell writing operation. Consequently, the magnitudes of currents $I_{SD}$ flowing through selected TFTs 204 vary according to where the conductive condition of each selected TFT 204 is in the electric-field range extending from the low-field condition to the high-field condition. Since the capacitor charging time is the same for all of selected liquid-crystal capacitors $C_{LC}$ and corresponding storage capacitors $C_S$, the charge provided to each selected cell capacitor $C_{LC}$ and corresponding storage capacitor $C_S$ during the cell writing period varies in accordance with the image pattern according to where the conductive condition of corresponding selected TFT 204 is in the electric-field range extending from the low-field condition to the high-field condition.

Membrane 200, which isolates liquid-crystal cells 202 from the high-vacuum electron beam environment, consists of lower dielectric layer 41 of insulating polymer disposed over display electrodes 31, conductive ground plane 44 overlying lower polymer dielectric layer 41, and an upper dielectric layer 45 of insulating polymer overlying ground plane 44. Ground plane 44 is typically connected in common with common electrode 91 to line 441 for receiving common-plane reference voltage $V_{ref}$. The thickness of membrane 200 is typically less than 3 µm to provide sufficient flexibility to conform to deviations in the surface flatness of transparent substrate 90, with sufficient strength and durability due to multilayer construction to withstand cell processing and handling without loss of mechanical integrity. Molded spacers 43 formed in lower polymer dielectric layer 41 precisely control the thickness of liquid-crystal layer 70 disposed between light-reflective display electrodes 31 and ITO-coated glass faceplate 90.

A passivation dielectric layer 46 is situated on upper insulating polymer layer 45. Source electrodes 53 connect display electrodes 31 to TFTs 204 via openings through multilayer membrane 200 and passivation layer 46. The laminated light-modulation structure of FIG. 1a further includes a collector grid structure formed with a collector grid 62 and an underlying grid dielectric 63. Although not shown in FIG. 1a, delta coatings 59 preferably form a continuous layer that extends under grid dielectric 63. Subject to the presence of the continuous delta layer, grid dielectric 63 extends over passivation layer 46. TFTs 204 are also situated over passivation layer 46 and are exposed through openings in the collector grid structure. A collector potential $V_{coll}$ is supplied on an electrical line 600 connected to collector grid 62.

Referring to FIG. 5, it illustrates a timing diagram that facilitates understanding typical operation of the light modulator of FIG. 1. FIG. 5 presents timing curves for:

a. Reference potential $V_{ref}$ on line 441 connected to common electrode 91 and ground plane 44,
b. Collector voltage $V_{coll}$ on line 600 connected to collector grid 62,
c. Cathode voltage $V_{wgk}$ on writing gun cathode 402 of writing electron gun 400,
d. Beam current $I_{wb}$ of scanning electron beam 401 of writing electron gun 400,
e. Cathode voltage $V_{egk}$ on erase gun cathode 502 of erase electron gun 500,
f. Beam current $I_{eb}$ of flood electron beam 501 of erase electron gun 500,
g. Charge δ on a delta coating 59,
h. Drain voltage $V_D$,
i. Liquid-crystal cell voltage $V_{LC}$, and
j. Display brightness.

During a first time interval constituting a subset of the time required for a video field, reference potential $V_{ref}$ is set to 0 V. Collector potential $V_{coll}$ is set to 10 V relative to reference potential $V_{ref}$ to provide a high collection field at 10 V/µm. Erase gun electron beam 501 is off. Writing gun cathode potential $V_{wgk}$ is set at −200 V with respect to reference voltage $V_{ref}$. Average electron energy $V_{PE}$ of writing beam 401 is greater than first electron crossover potential $V_{CR1}$, and delta layer 59 of each selected TFT 204 charges in the positive direction toward collector potential $V_{coll}$. With the distribution of electron current $I_{wb}$ in scanning electron beam of writing electron gun 400 being substantially Gaussian as shown in FIG. 2, beam 401 sequentially scans each horizontal line in the TFT array and induces positive charge on delta coating 59 of each selected TFT 204 by means of secondary electron emission as shown in FIG. 4. The magnitude of the induced positive charge (δ-charge) is proportional to electron current $I_{wb}$ in writing electron beam 401 and the dwell time of beam 401. The magnitude of electron-beam current $I_{wb}$ is determined by the input picture information. The electron-beam dwell time on any TFT 204 is inversely proportional to the number of pixels in the display, but is constant for any specific resolution, e.g., less than 1.5 nsec for a 2500-line display.

Each delta coating 59 remains charged to the writing potential, i.e., less than or equal to collector voltage $V_{coll}$, until the deposited charge is erased by aerial electrons since there is no conducting discharge path. During this first time interval, voltage $V_D$ on drain electrodes 54 is set to high-impedance off potential $V_{HZ}$. Although there is a charge-induced electric field on the TFT channel regions causing TFTs 204 to be in their conductive conditions, there is no source current to charge liquid-crystal cell capacitors $C_{LC}$ and storage capacitors $C_S$. Consequently, no image is displayed as the entire video field is written into TFTs 204.

During a second time interval constituting a subset of the time required for the video field, after the entire TFT array is written, with the charge pattern representing a field of video information stored on delta coatings 59 in the TFT array, a short positive voltage pulse is applied to drain electrodes 54 of all TFTs 204 in the array. That is, drain voltage $V_D$ is switched to value $V_{CW+}$, typically 5 V, to provide voltage $V_{CW+}$ to all of the electrodes 54. Source-drain current $I_{SD}$ charges each selected liquid-crystal capacitor $C_{LC}$ formed with a selected liquid-crystal cell 202, corresponding display electrode 31, and the underlying part of cell common electrode 91. Source current $I_{SD}$ also charges corresponding storage capacitor $C_s$ formed in parallel to cell capacitor $C_{LC}$ by that display electrode 31, the overlying part of dielectric layer 41, and the further overlying part of ground plane 44. The duration of the $V_D$ pulse is determined by the time required to charge capacitors $C_{LC}$ and $C_s$ to maximum with maximum gate voltage $V_G$. A typical $V_D$ pulse width is 1 msec.

During a third time interval, immediately following application of the $V_D$ voltage pulse to drain electrodes 54, writing beam 401 is off. Reference voltage $V_{ref}$ is set to 0 V. Collector voltage $V_{coll}$ is 10 V. Voltage $V_S$ on each source electrode 53 is determined by corresponding liquid-crystal voltage $V_{LC}$. The typical maximum $V_{LC}$ voltage is 5 V. Erase gun cathode voltage $V_{egk}$ is set to 0 V relative to reference voltage $V_{ref}$. Erase gun electron beam 501 is gated on to produce erase beam current $I_{eb}$. The difference between voltage $V_{egk}$ of erase gun cathode 502 and the potential of delta layer 59 of each selected TFT 204 produces a value of average electron energy $V_{PE}$ less than first crossover potential $V_{CR1}$. Therefore, delta layer 59 of each selected TFT 204 collects electrons and charges to erase-gun cathode $V_{egk}$, now 0 V. The previously written TFT image pattern is thereby erased. Drain voltage $V_D$ is set to the high-impedance off value $V_{HZ}$, and no change in liquid-crystal voltages $V_{LC}$ or image quality occurs.

Maximum gate voltage $V_G$ for a selected TFT 204 is obtained with maximum electron-beam current $I_{wb}$ during the first of the three intervals. Intermediate levels of charge on a selected liquid-crystal capacitor $C_{LC}$ are obtained with intermediate levels of beam current $I_{wb}$ to provide a gray scale.

Each liquid-crystal capacitor $C_{LC}$, electrically connected to source electrode 53 of corresponding TFT 204, is charged to a voltage proportional to the voltage induced by electron beam 401 on delta coating 59 of corresponding TFT 204.

This voltage is maintained due to the high impedance of the drain driver in the off state. During this third display interval, polarized light 912 reflected from liquid-crystal display electrodes 31 is intensity-modulated (display brightness) in accordance with the voltage charge pattern and displayed on a viewing screen.

The present invention also solves a major defect in conventional active matrix liquid-crystal display devices. Conventional TFT designs create parasitic capacitance, caused by source/gate overlap, in series with the liquid-crystal capacitors. This parasitic capacitance discharges the liquid-crystal capacitors and causes image degradation. Each TFT 204 in the present light modulator incorporates a virtual gate in which there is no conductive path to discharge the gate capacitor, other than by charge neutralization by aerial electrons.

Voltages $V_{LC}$ across liquid-crystal cells 202 must be discharged to reference potential $V_{ref}$ following the third display interval, and prior to writing a subsequent field of image data. During a fourth time interval immediately prior to writing a new video field, writing electron beam 401 is off. Reference voltage $V_{ref}$ is set to 0 V. Collector voltage $V_{coll}$ is 10 V. Erase gun cathode voltage $V_{egk}$ is set to −200 V relative to reference voltage $V_{ref}$. Voltage $V_S$ on each source electrode 53 is determined by corresponding liquid-crystal voltage $V_{LC}$. The typical maximum $V_{LC}$ voltage is 5 V. Erase-gun electron beam 501 is gated on. The difference between the potential $V_{egk}$ of erase gun cathode 502 and the potential of each delta layer 59 produces average electron energy $V_{PE}$ greater than crossover potential $V_{CR1}$. Therefore, delta layers 59 emit secondary electrons and charge to collector potential $V_{coll}$. A short-duration, 0-V, low-impedance voltage pulse is applied to drain electrodes 54 of all TFTs 204. That is, drain voltage $V_D$ is switched to erase value $V_{CE}$, 0 V, to provide voltage $V_D$ to all of electrodes 54. The $V_D$ pulse width is of sufficient duration to discharge voltages $V_{LC}$ on all liquid-crystal cell capacitors $V_{LC}$. A typical discharge time is 0.5 msec. The drain voltage driver is set to high-impedance off-state value $V_{HZ}$. Erase gun cathode voltage $V_{egk}$ is set to 0 V, and erase gun electron beam 501 is gated on to reset delta layers 59 to reference potential $V_{ref}$. The light modulator is now set to receive a new video field.

The polarity of drain voltage $V_D$ during TFT writing operations (second interval) is inverted (switched between $V_{cw+}$ and $V_{cw-}$) on alternate video fields. This prevents DC offset at liquid-crystal cells 202.

The TFT array, isolated from liquid-crystal cells 202 by means of display electrodes 31 and isolating polymer layers 41 and 45 including ground plane 44, is a superior replacement for prior art anisotropically conducting substrates, conductive pin arrays, and thin (largely) dielectric membranes.

The present spatial light modulator, with the unique capability to separate the functions of image "write" and image "display" together with fast-response liquid-crystal operating modes, offers the possibility of ultra-high resolution displays with temporal response characteristics of film-gate motion pictures.

Figure 6A:
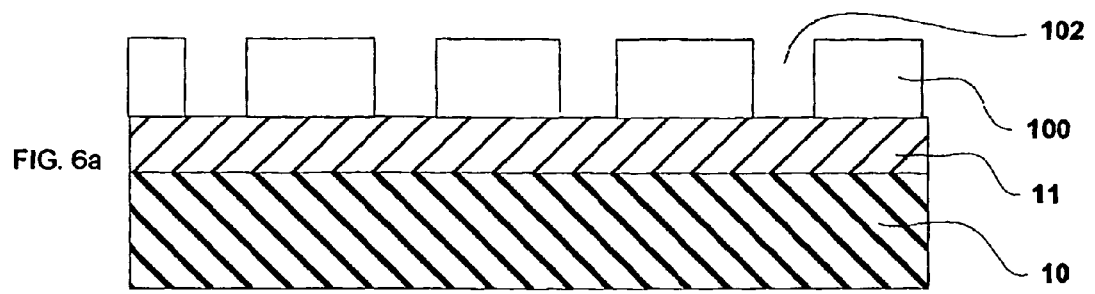

FIGS. 6a–6e (collectively "FIG. 6") illustrate steps in accordance with the invention for manufacturing a mandrel substrate on which the light modulator of FIG. 1a is fabricated. Referring to FIG. 6a, the starting material is substrate 10 preferably consisting of glass such as Corning 1737 or equivalent at a thickness of 0.7–1.1 mm in order to be compatible with existing active matrix array commercial tools and processes. A blanket layer 11 of nickel is deposited by sputtering means to a thickness of 1.3 µm. The nickel-layer thickness is defined according to calculations describing the desired optical thickness of liquid-crystal layer 70. Nickel layer 11 is polished by chemical mechanical polishing (or planarization) to a high reflectivity.

Figure 6B:
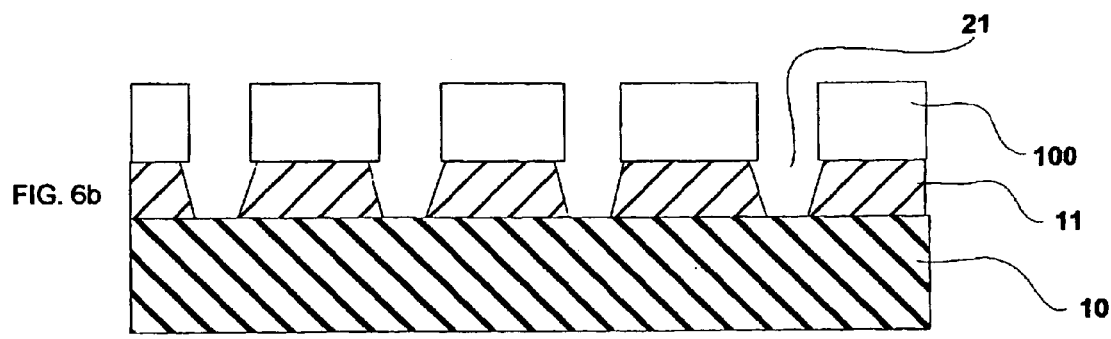

Nickel layer 11 is coated with a positive tone photoresist 100 typically provided by Arch Chemical Company or other commercial vendor. Photoresist 100 is exposed to actinic light through a photomask and developed by conventional means to define a pattern 102 in resist 100 whereby portions of nickel layer 11 are uncovered. The uncovered portions of nickel layer 11 are chemically etched in a commercially available etchant provided by Transene Chemicals or other vendor to remove nickel metal in the regions defined by pattern 102, thereby producing a nickel spacer mold 21 as shown in FIG. 6b. Glass substrate 10 is not chemically attacked by the etchant. A tapering cross section for spacer mold 21 is created by addition of 1.5 volume percent nitric acid to the nickel etchant.

Figure 6C:
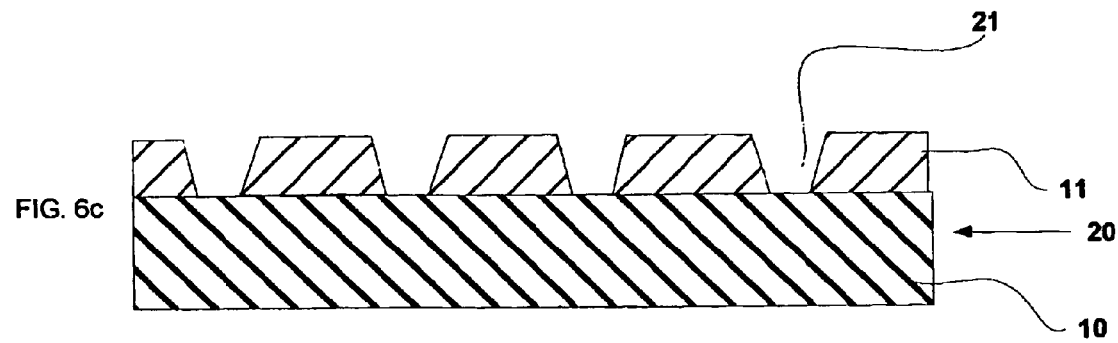
Figure 6D:
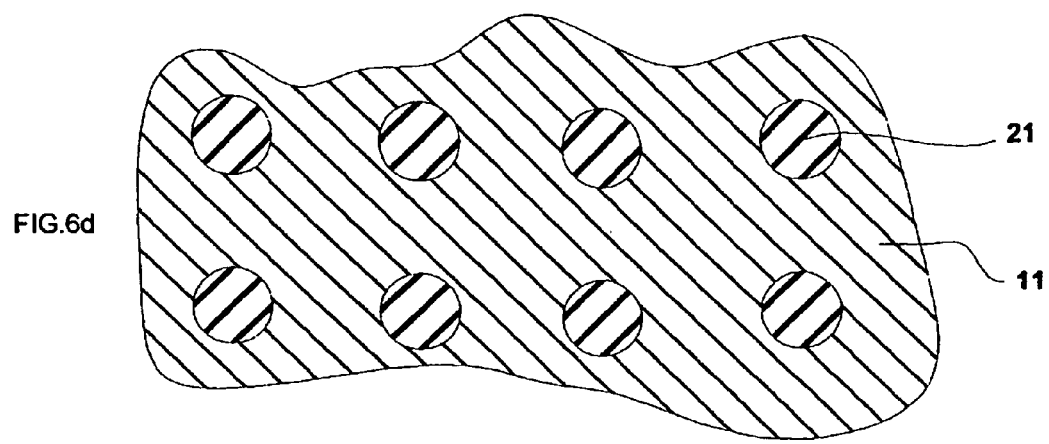
FIG. 6d is a plan view of the intermediate structure of FIG. 6c.

FIG. 6c shows mandrel 20, including spacer mold 21, after removal of photoresist 100 by conventional chemical means. The diameter of spacer mold 21 is typically 1.5 µm. The depth of spacer mold 21 is controlled by the thickness of nickel layer 11 since substrate 10 is not attacked by the nickel pattern etchant. FIG. 6d shows a plan view of mandrel 20. Spacer mold 21 is disposed in a regular array for which the preferred dimension between the centers of the features of spacer mold 21 in the x-direction is 5 µm, and the preferred dimension between the mold-feature centers in the y-direction is 5 µm. Mandrel 20, including spacer mold 21 and substrate 10 exposed at the bottom of spacer mold 21, is coated with a mold release 22 by sputtering means as shown in FIG. 6e. The preferred material for mold release 22 is a material containing amorphous carbon or boron carbide.

Figure 7D:
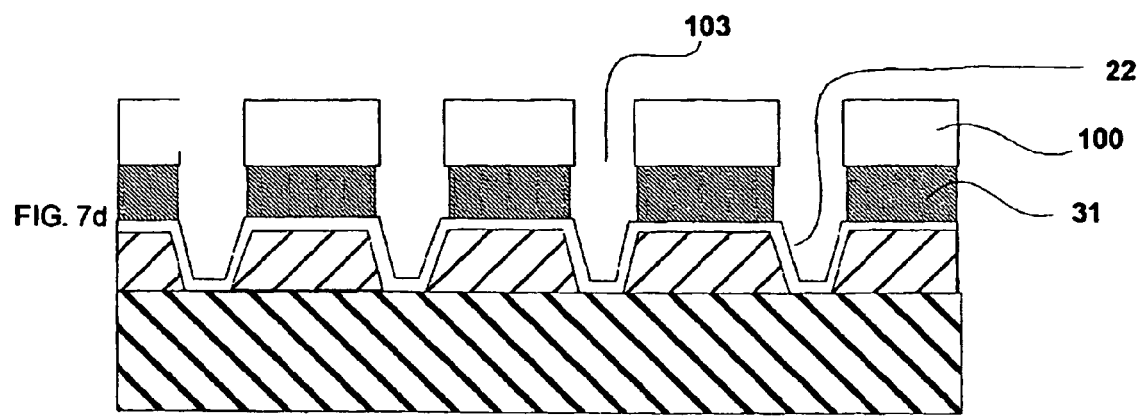

FIGS. 7a–7j (collectively "FIG. 7") illustrate initial steps in accordance with the invention for manufacturing the light modulator of FIG. 1a using mandrel substrate 20 fabricated according to process of FIG. 6. FIG. 7 specifically shows a preferred process sequence for fabrication of a flexible conformal film, incorporating an array of TFTs disposed on a first side, and a corresponding array of display electrodes disposed on a second side. In FIG. 7a, a layer 30 of aluminum is deposited over mandrel 20 to a preferred thickness of 1 µm by sputtering means, and is coated with a positive tone photoresist 100. Photoresist 100 is exposed to actinic light through a photomask, with alignment and optical registration, to superimpose a pattern 103 on previously defined pattern 102 as shown in FIG. 7b, and developed by conventional means to define a pattern 103 in resist 100 whereby portions of aluminum layer 30 are uncovered. FIG. 7c is a plan view of photopattern 103.

Figure 7E:
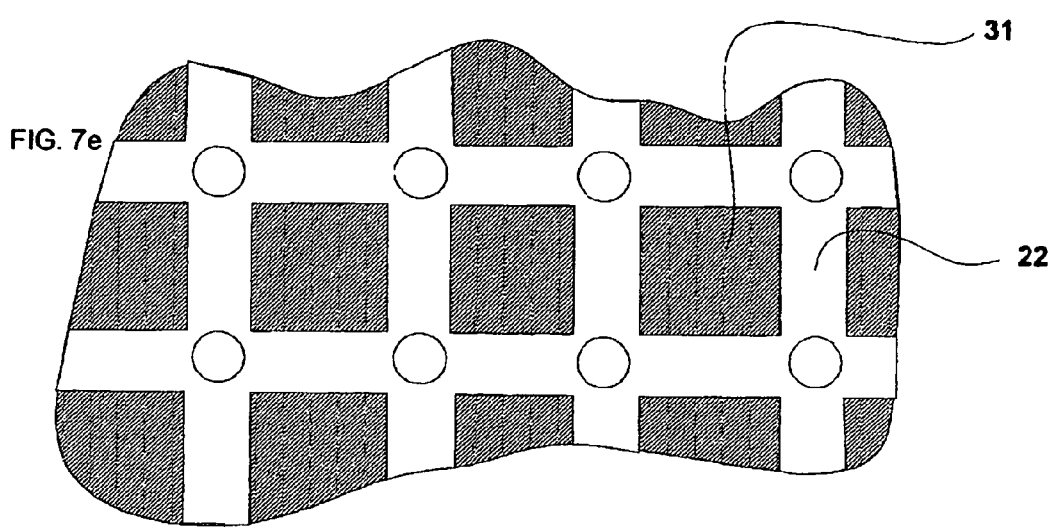

The uncovered portions of aluminum layer 30 are chemically etched with a commercially available etchant provided by Transene Chemicals or other vendor to remove aluminum metal in the regions defined by pattern 103 to define display electrodes 31 as shown in FIG. 7d. Mold release 22 is not chemically attacked by the aluminum etchant. Display electrodes 31 are disposed in a regular array over mandrel 20 as shown in FIG. 7e, a plan view of display electrodes 31 disposed on mandrel 20, where the preferred dimension between the centers of display electrodes 31 in the x-direction is 5 µm, and the preferred dimension between the display-electrode centers in the y-direction is 5 µm. Photoresist 100 having pattern 103 is removed.

Figure 7F:
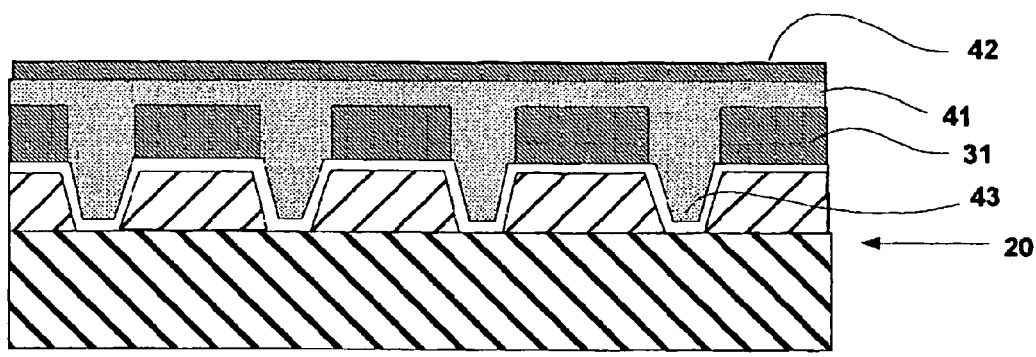

Mandrel 20, together with the display electrode array and spacer mold 21, is coated with a liquid polymer material, such as PI 2610 supplied by HD Microsystems, and cured at 350° C. to a preferred film thickness of 0.5–1 µm to form display element storage capacitor dielectric layer 41 and spacer elements 43. The polymer of dielectric layer 41 adheres to display electrodes 31, but does not adhere to mold release 22. A layer 42 of chromium is deposited by sputtering means over capacitor dielectric 41 to a film thickness of 100 nm as shown in FIG. 7*f*.

Figure 7G:
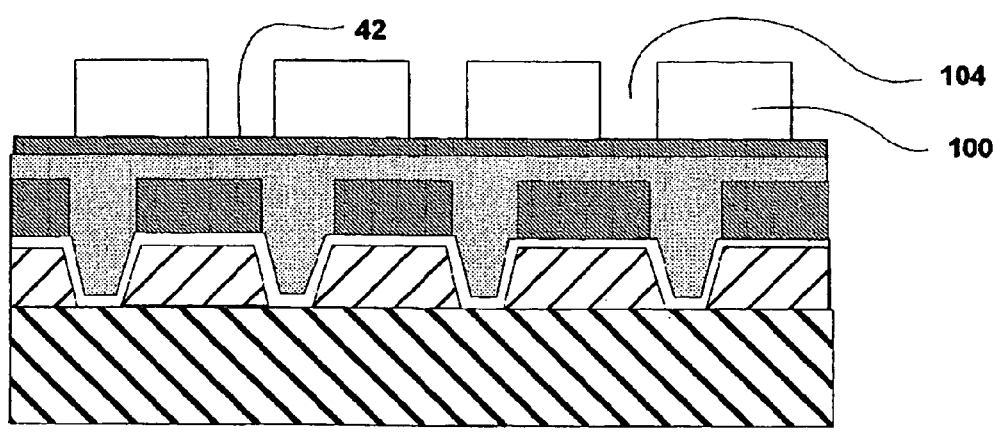
Figure 7H:
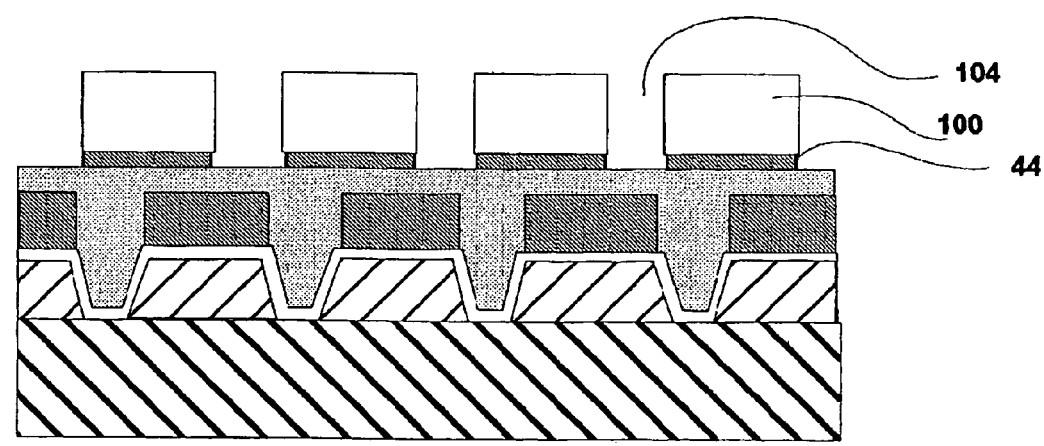

Chromium layer 42 is coated with a positive tone photoresist 100 and exposed to actinic light through a photomask, with alignment and optical registration, to superimpose a pattern 104 on previously defined pattern 103. Photoresist 100 is developed by conventional means to define pattern 104 in resist 100 whereby portions of chromium layer 42 are uncovered as shown in FIG. 7*g*. The uncovered chromium is chemically etched with a commercially available etchant provided by Transene Chemicals or other vendor to remove the chromium metal in the regions defined by pattern 104 to define ground plane 44 as shown in FIG. 7*h*. Photoresist 100 having pattern 104 is removed.

Figure 7I:
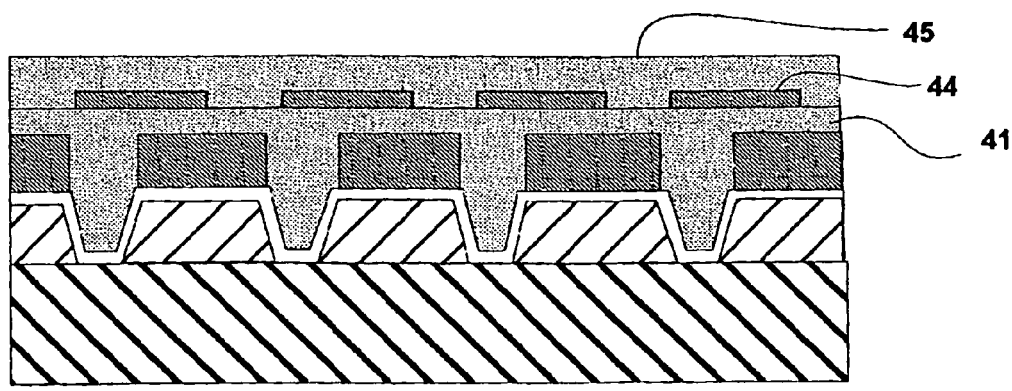
Figure 7J:
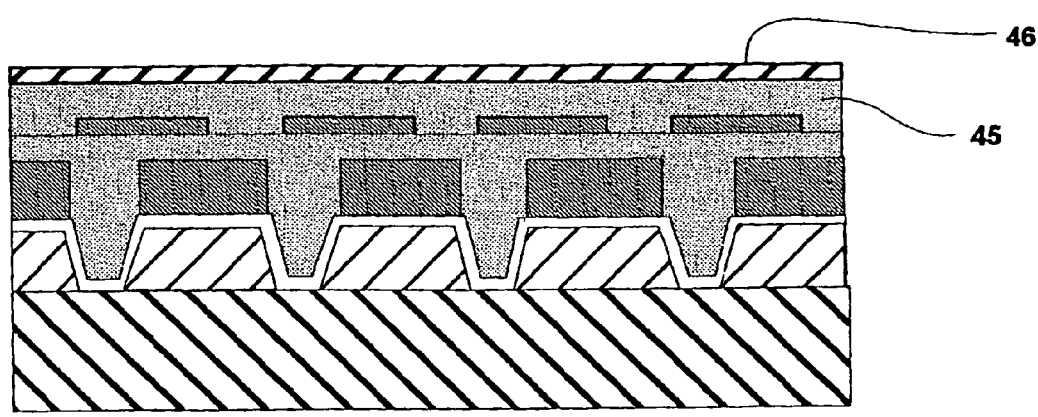

A second layer of liquid polymer material, such as PI 2610 supplied by HD Microsystems, is coated over ground plane 44 and the exposed portions of storage capacitor dielectric 41, and cured at 350° C. to a preferred film thickness range of 0.5–1 µm to form first isolation dielectric layer 45 as shown in FIG. 7*i*. Second isolation dielectric layer 46 of passivating electrically insulating material is deposited over first isolation dielectric layer 45 to a preferred thickness of 200 nm as shown in FIG. 7*j*. The preferred material for dielectric layer 46 is silicon dioxide deposited by a plasma enhanced chemical vapor deposition ("PECVD") process.

Figure 8A:
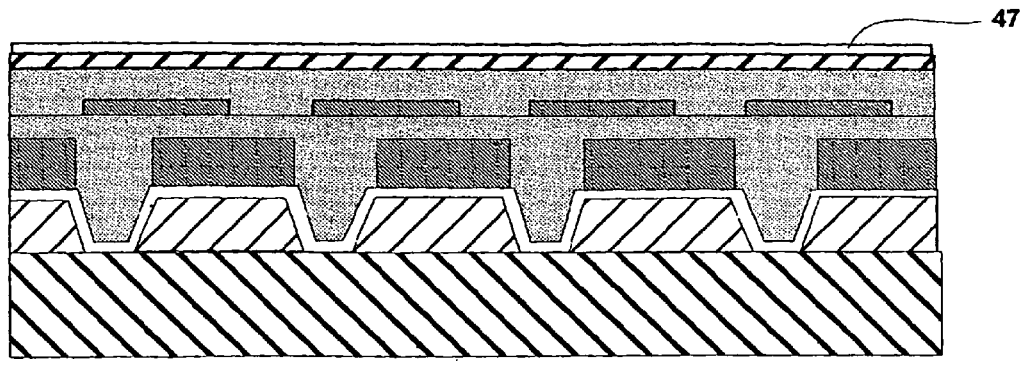
Figure 8B:
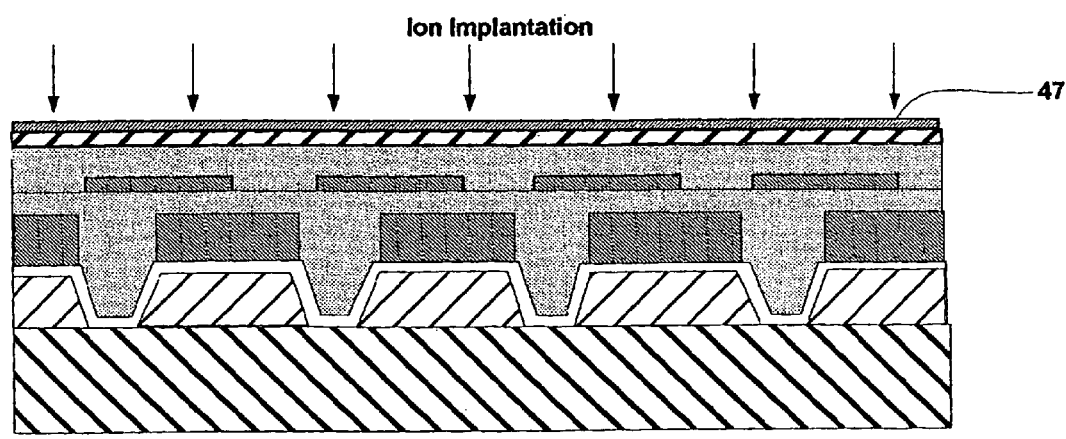

FIGS. 8*a*–8*m* (collectively "FIG. 8") illustrate further steps in accordance with the invention for manufacturing the light modulator of FIG. 1*a* starting with the intermediate structure fabricated according to the steps of FIG. 7. FIG. 8 presents a preferred sequence for fabrication of the TFT array. A blanket layer 47 of amorphous silicon (α-Si) is deposited by conventional PECVD means from a gaseous mix of silane and helium to a preferred thickness of 90 nm as shown in FIG. 8*a*. Blanket amorphous silicon layer 47 is then made conductive to contact with metals forming silicides. A preferred metal is chromium. Referring to FIG. 8*b*, silicon layer 47 is made electrically conductive n-type by bombarding it with phosphorus ions at an energy of 30 kV and a high dosage of $4 \times 10^{15}$ ions/cm$^2$.

Figure 8C:
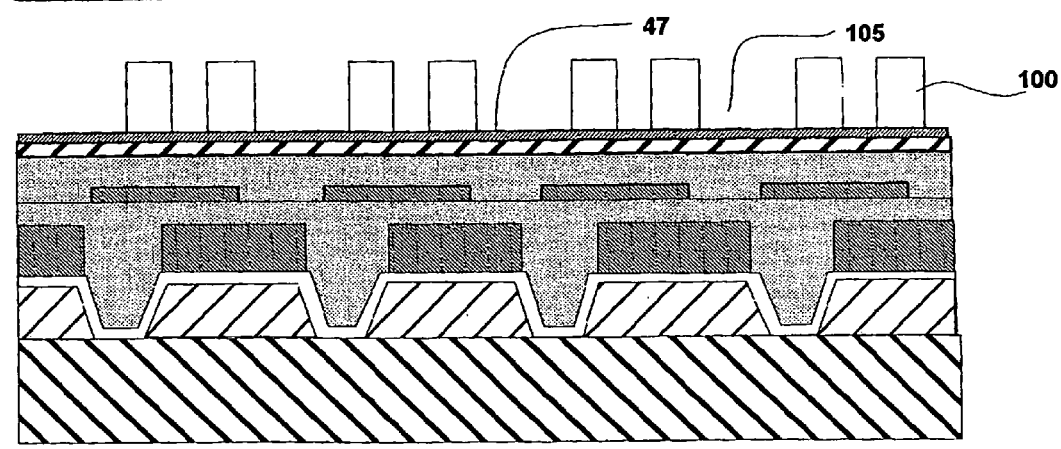
Figure 8D:
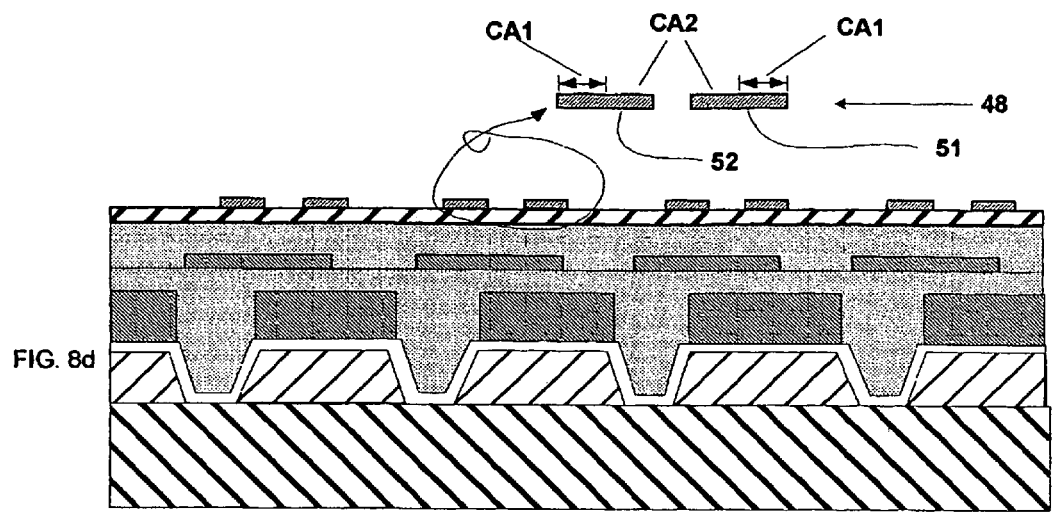

As shown in FIG. 8*c*, heavily doped n-type silicon layer 47 is coated with a positive tone photoresist 100 and exposed to actinic light through a photomask, with alignment and optical registration, to superimpose a pattern 105 on the previously defined array of display electrodes 31. Photoresist 100 is subsequently developed by conventional means to define pattern 105 in resist 100 whereby portions of amorphous silicon layer 47 are uncovered. The uncovered portions of silicon layer 47 are etched by conventional reactive ion etching ("RIE") in a gas containing fluoride ions to define an array of heavily doped n-type source/drain pairs 48 as shown in FIG. 8*d*. A preferred etching gas is sulfur hexafluoride (SF$_6$). Photoresist 100 having pattern 105 is removed.

Each source/drain pair 48 is associated with, and overlies, a display electrode location. In each source/drain pair 48, a first region 51, associated with a source electrode, and a second region 52, associated with a drain electrode, are spaced apart by a distance determined by the requirements for TFT channel geometry. In the present invention, the channel length is 2 µm, and the channel width is 3 µm. Additionally, each source/drain region 51 or 52 is comprised of a first contact area CA1 and a second contact area CA2. Contact area CA1 constitutes approximately half of the area of region 51 or 52. Contact area CA2 constitutes the remaining half.

Figure 8E:
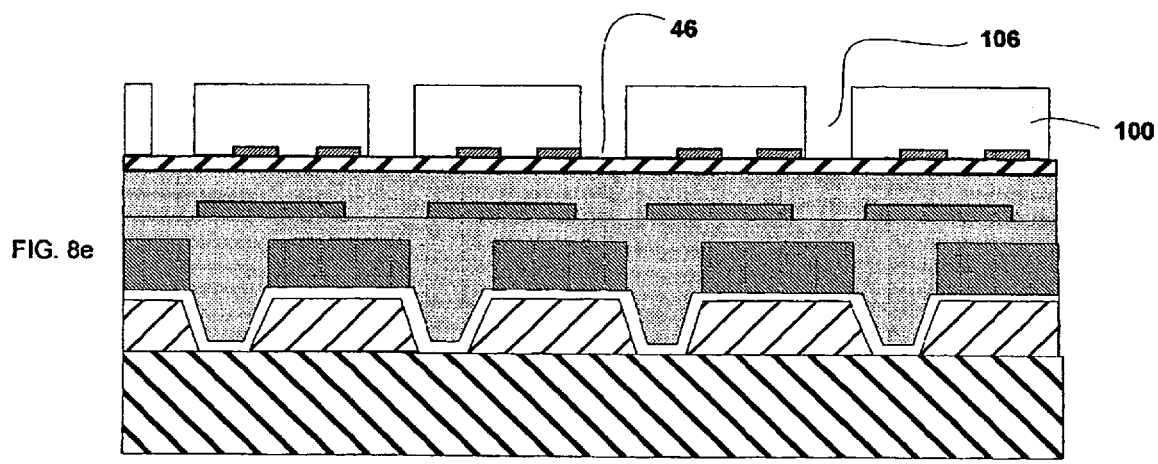

As shown in FIG. 8*e*, second dielectric layer 46, together with the array of source/drain pairs 48, is coated with a positive tone photoresist 100 and exposed to actinic light through a photomask, with alignment and optical registration, to superimpose a source via pattern 106 on the previously defined display electrode array. Photoresist 100 is subsequently developed by conventional means to define pattern 106 in resist 100 whereby portions of second isolation dielectric layer 46 are uncovered. The exposed material of layer 46 is etched by conventional RIE gas chemistry containing fluoride ions to expose portions of first isolation dielectric layer 45. A preferred RIE gas composition is sulfur hexafluoride.

Figure 8F:
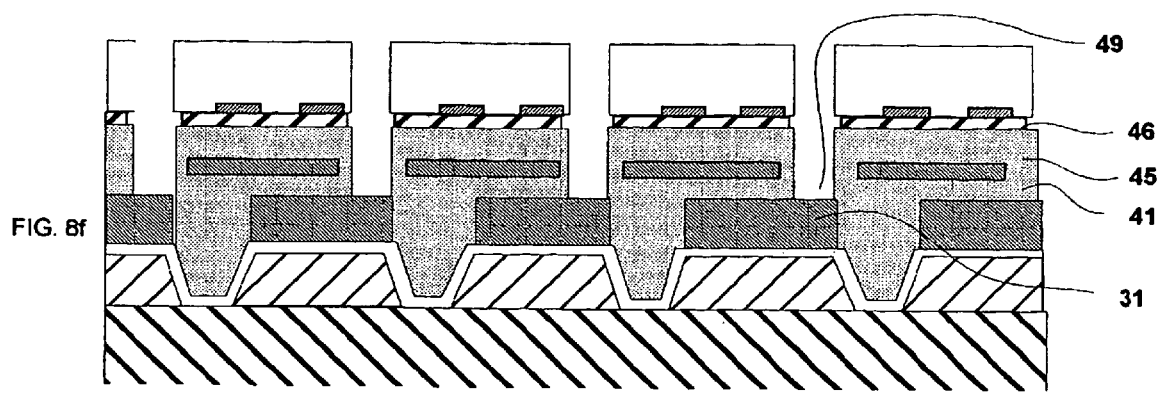

Isolation dielectric layer 45, together with storage capacitor dielectric layer 41, is dry etched by conventional oxygen plasma gas chemistry to form source vias 49. Display electrodes 31 are not etched by the chemistry used to etch source vias 49, and so provide a stop for the etching process. Vias 49 are subsequently etched by wet chemistry containing fluoride ions to remove residues from the dry etch process and to etch back second isolation dielectric layer 46 to increase the via dimension in layer 46 as shown in FIG. 8*f* to a larger dimension than source vias 49 in layer 45. Photoresist 100 having pattern 106 is removed.

Figure 8G:
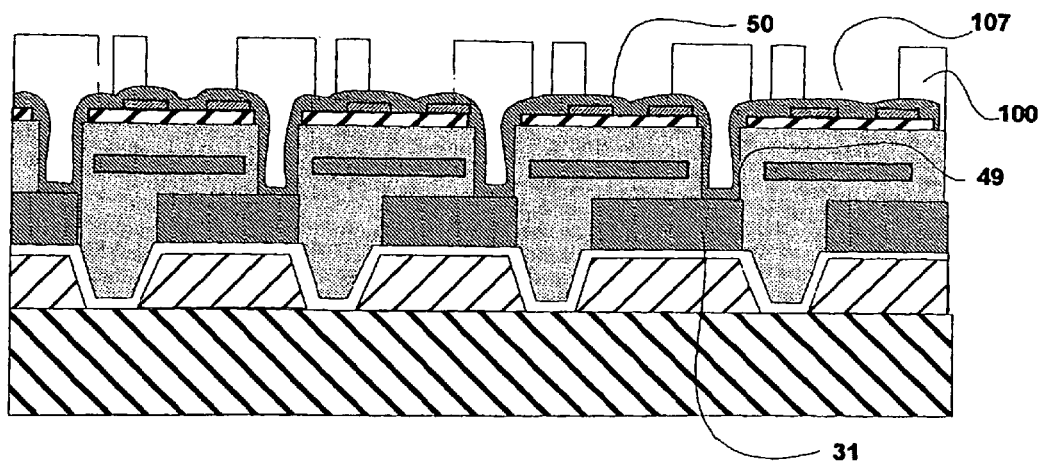

A blanket layer 50 of metal forming ohmic contact to n+ source/drain pairs 48 is deposited by sputtering means over second isolation dielectric layer 46, over source/drain pairs 48 and into source vias 49 to contact the exposed portions of display electrodes 31. A preferred metal is chromium deposited to a thickness of 200 nm. As shown in FIG. 8*g*, metal layer 50 is coated with a positive tone photoresist 100 and exposed to actinic light through a photomask, with alignment and optical registration, to superimpose a pattern 107 over previously defined source/drain pairs 48. Photoresist 100 is subsequently developed by conventional means to define pattern 107 in resist 100 whereby portions of metal layer 50 are uncovered. The uncovered portions of layer 50 are chemically etched with a commercially available etchant provided by Transene Chemicals or other vendor to remove the metal in the regions defined by pattern 107 to define source-electrode pattern 53 and drain-electrode pattern 54.

Figure 8H:
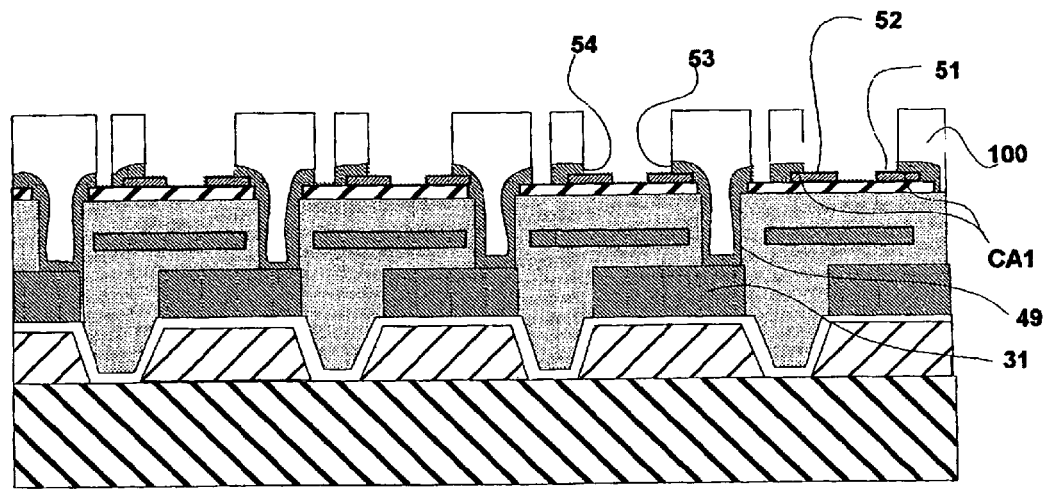

Each source electrode 53 overlies a source via 49, making electrical contact to a display electrode 31, and associated contact area CA1 of a source region 51 as shown in FIG. 8*h*. Each drain electrode 54 is electrically connected in common to all other drain electrodes 54 and makes electrical contact to associated contact area CA1 of a drain region 52. Photoresist 100 having pattern 107 is removed.

A semiconductor layer 55 of amorphous silicon (α-Si) is deposited by conventional PECVD means from a gaseous mix of silane and helium to a preferred thickness of 90 nm so as to overlie the array of source/drain pairs 48, source electrodes 53, drain electrodes 54, and second isolation dielectric 46. A gate dielectric layer 56 of silicon nitride is deposited by PECVD from a gas mix of silane and ammonia over silicon layer 55. Layers 55 and 56 are preferably deposited sequentially from the same deposition tool without exposure of amorphous silicon layer 55 to atmospheric contamination.

Gate dielectric layer 56 is coated with a positive tone photoresist 100 and exposed to actinic light through a photomask, with alignment and optical registration, to superimpose a pattern 108 over the previously defined array of source/drain pairs 48. Photoresist 100 is subsequently developed by conventional means to define pattern 108 in resist 100 whereby portions of gate dielectric layer 56 are uncovered. The exposed portions of gate dielectric layer 56 and silicon layer 55 are sequentially dry etched by conventional RIE means using sulfur hexafluoride gas chemistry to define silicon islands 57 together with overlying gate dielectric layers 58. Source electrodes 53 and drain electrodes 54 are not etched by this chemistry, and so provide etch stopping. Photoresist 100 having pattern 108 is removed. Each silicon island 57 overlies the contact area CA2 of a source region 51 and contact area CA2 of associated drain region 52 as shown in FIG. 8i.

Referring to FIG. 8j, blanket delta layer 59 of electrically insulating material with the materials property of a high ratio of emitted secondary electrons when stimulated by a primary electron beam of sufficient energy is deposited to a thickness of 10 nm over the uncovered portions of gate dielectric layers 58, source electrodes 53, drain electrodes 54, and second isolation dielectric 56. A preferred material for delta layer 59 is magnesium oxide deposited by vacuum evaporation.

As shown in FIG. 8k, delta layer 59 is coated with a liquid polymer material, such as PI2610 supplied by HD Microsystems, and cured at 350° C. to a preferred film thickness of 1–1.5 µm to form an electrically insulating layer 60. A blanket layer 61 of chromium is sputter deposited over delta layer 59 to a preferred thickness of 300 nm.

Figure 8L:
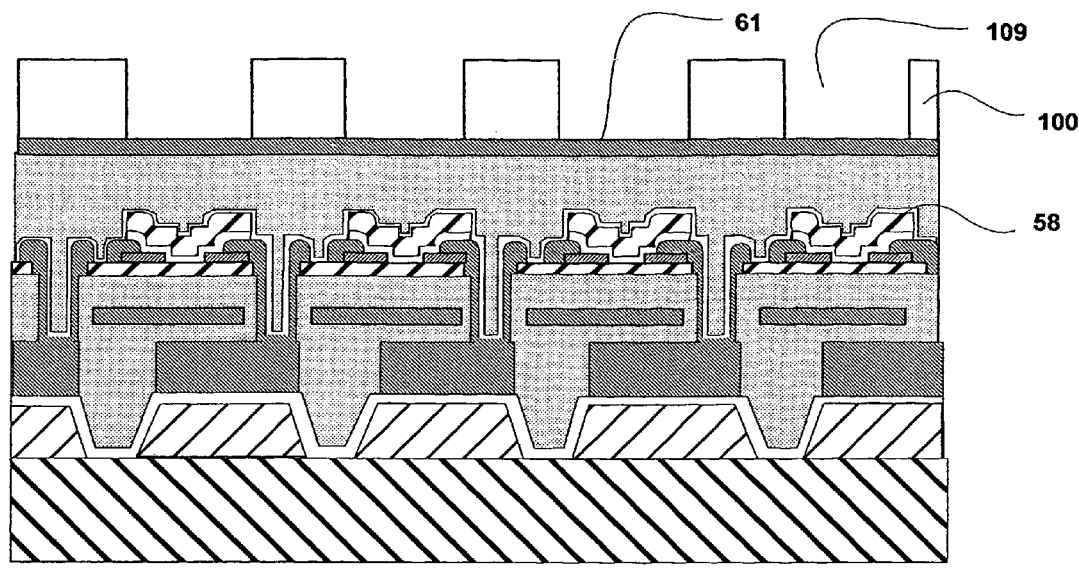
Figure 8M:
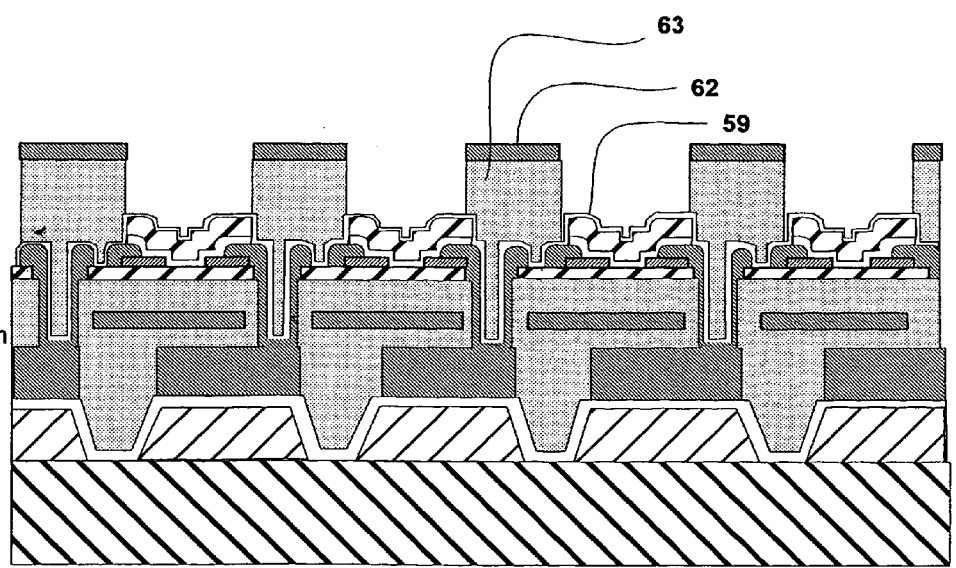

As shown in FIG. 8l, chromium layer 61 is coated with a positive tone photoresist 100 and exposed to actinic light through a photomask, with alignment and optical registration, to superimpose a pattern 109 over previously defined gate dielectric 58. Photoresist 100 is subsequently developed by conventional means to define pattern 109 in resist 100 whereby portions of chromium layer 61 are uncovered. The uncovered chromium is chemically etched in a commercially available etchant provided by Transene Chemicals or other vendor to remove chromium metal in the regions defined by pattern 109 to define collector grid 62, and to expose portions of insulating layer 60 in regions overlying gate dielectric 58.

The exposed regions of layer 60 are etched by RIE, using oxygen plus fluoride ion gas chemistry, to remove the portions of polymeric insulating layer 60 in the regions not protected by collector electrode 62 to form collector insulator 63. See FIG. 8m. Chromium has high selectivity to the etchant chemistry, and so provides a suitable etch mask for removal of polymer. Additionally, delta layer 59 is not attacked by this etchant chemistry, and so serves an etch stop to protect gate dielectric 58 from damage. Photoresist 100 having pattern 109 is removed. TFTs 204 of active matrix 201 are now complete.

Figure 9A:
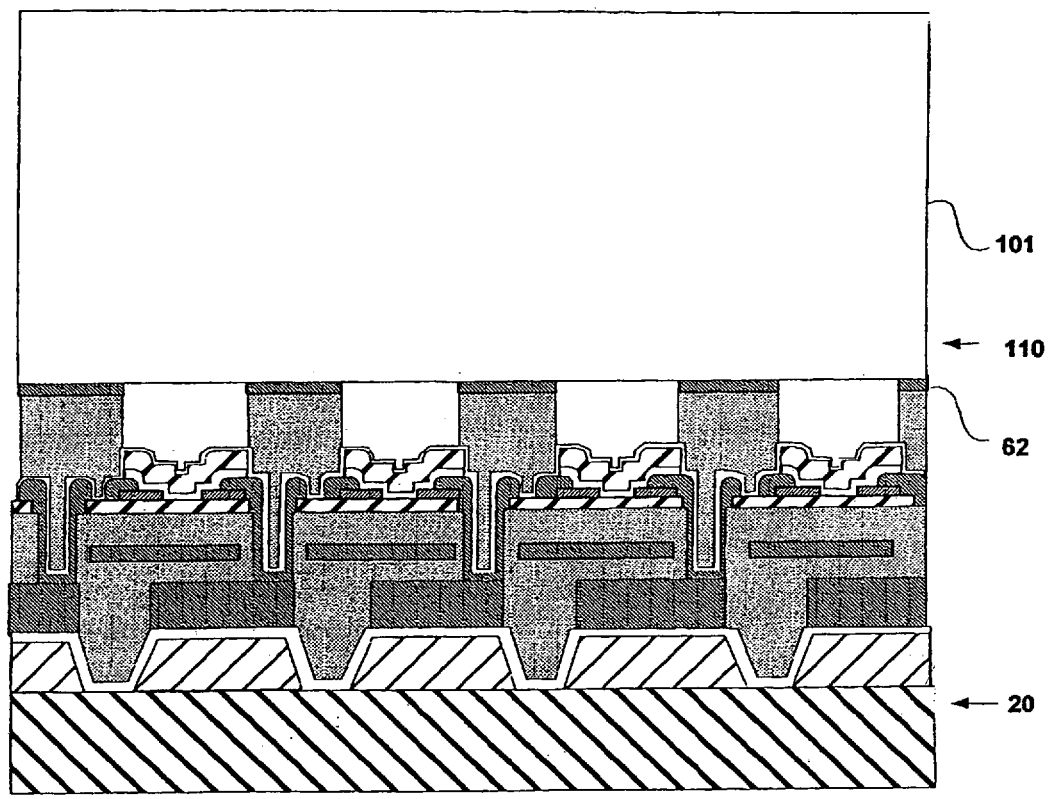
FIGS. 9a, 9c, and 9d are cross-sectional side views representing yet further steps, starting from the stage of FIG. 8m, in the process for manufacturing the light modulator of FIG. 1a according to the invention.

In order to construct a liquid-crystal spatial light modulator, display electrodes 31 and spacing elements 43 must be released from mandrel substrate 20. FIGS. 9a–9d (collectively "FIG. 9") illustrate steps in accordance with the invention for removing mandrel substrate 20 in manufacturing the light modulator of FIG. 1a. To improve handling properties during release, and provide a robust backing for the array during subsequent liquid-crystal cell processing, a sacrificial backing film is created. As shown in FIG. 9a, a layer of dry film photoresist 101 is laminated to TFT array 201, making contact only to collector grid 62, to a form sub-assembly 110. A preferred dry film photoresist is Riston Tentmaster dry film tenting resist formulated to span the space between features similar to collector grid 62. Resist 101 is laminated to collector grid 62 by a heated roller process at 105° C., following array processing. Riston is a negative tone photoresist, with polymerization in areas exposed to actinic light. In this case where Riston is used as a sacrificial film and must be subsequently removed, resist 101 is not exposed to actinic light in order to facilitate stripping of the protective Riston film material following the cell fabrication process.

Figure 9B:
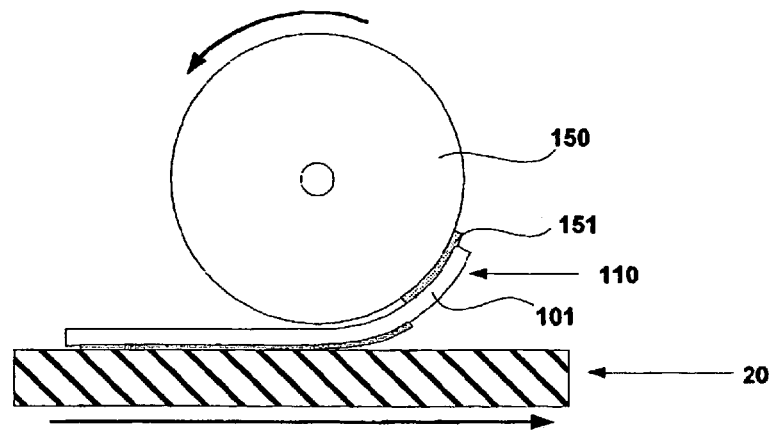
Figure 9C:
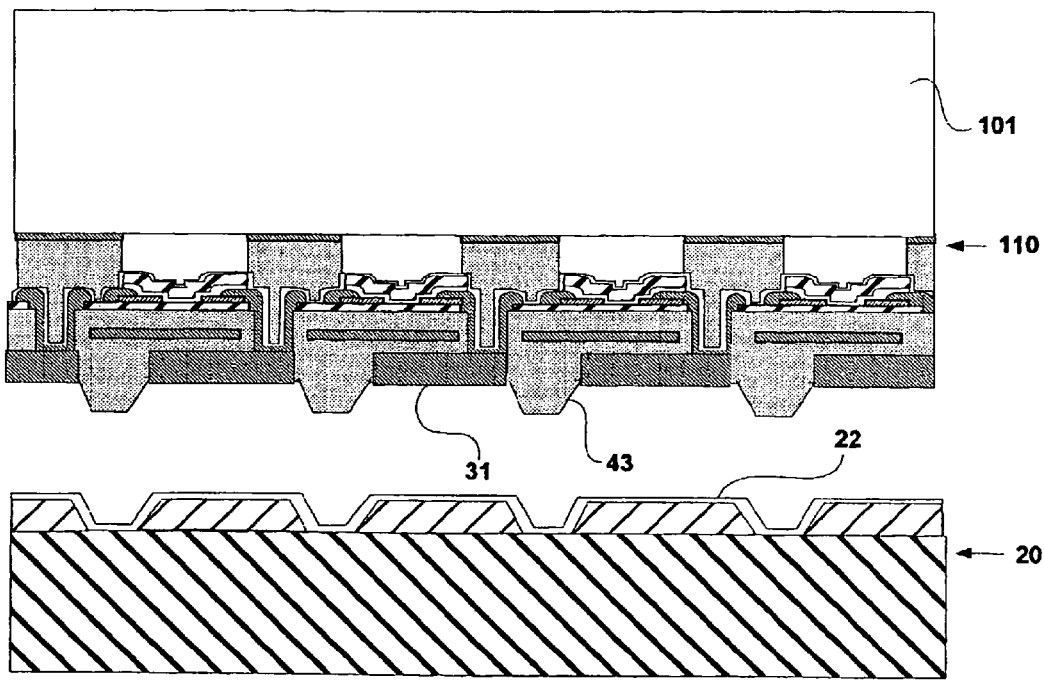

A single edge termination of laminated resist 101, overlying completed TFT active-matrix array 201 and including mandrel 20, is attached by an adhesive film strip 151 to a delamination roller 150 as shown in FIG. 9b. Roller 150, with rotation as shown in FIG. 9b, produces delamination of subassembly 110 from mandrel 20. The delamination of subassembly 110 from mandrel 20 takes place at the surface of mandrel 20 coated with mold release 22 to reveal the lower modulator surface formed with spacing elements 43 and display electrodes 31 as shown in FIG. 9c.

Figure 9D:
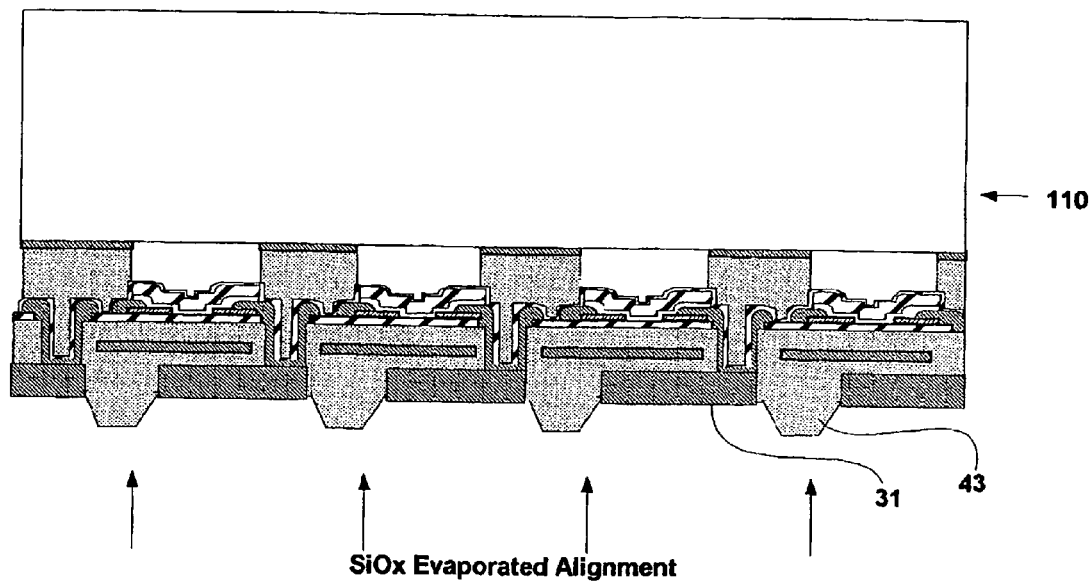
Figure 10:
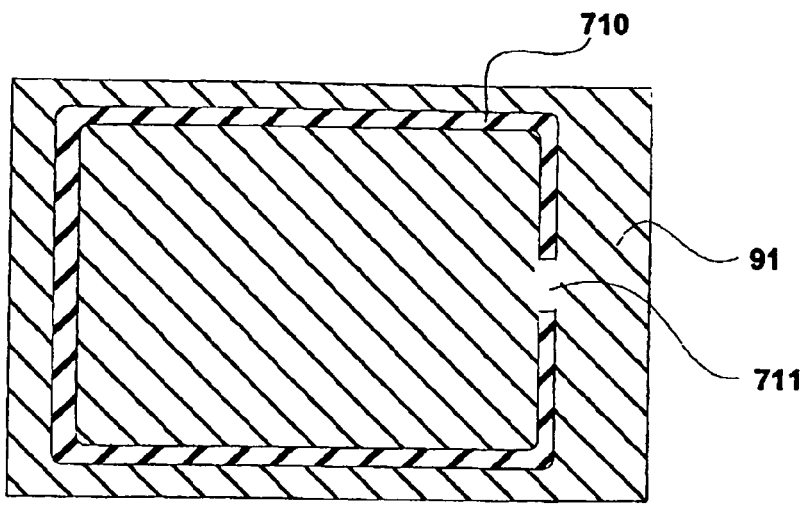
FIGS. 10–13 are views representing later steps, starting from the stage of FIG. 9d, in the process for manufacturing the light modulator of FIG. 1a according to the invention.

In order to obtain good optical characteristics, liquid-crystal cells 202 must possess ordered alignment of their liquid-crystal molecules. This is typically accomplished by depositing a thin dielectric layer (not shown) over the lower modulator array surface. A preferred material is silicon oxide deposited over display electrodes 31 and associated spacer elements 43 to a thickness of 20 nm by vacuum evaporation means to form an alignment surface as shown in FIG. 9d.

FIGS. 10–13 illustrate the remaining steps in accordance with the invention for manufacturing the light modulator of FIG. 1a. After forming common transparent electrode 91 on transparent modulator substrate 90, thermoplastic resin seal material, such as UVG-21 supplied by Cardinal Industries, is dispensed over common electrode 91 in a pattern corresponding to the perimeter of subassembly 110 to form a perimeter seal ring 710. See FIG. 10. The width of perimeter seal 710 is 0.25–0.5 mm. A gap 711, typically 3–5 mm, in the perimeter seal pattern facilitates subsequent filling of the liquid-crystal material following cell assembly. A first cure of seal ring 710 is obtained by exposure of the uncured ring to actinic light at a wavelength of 240–365 nm.

Figure 11:
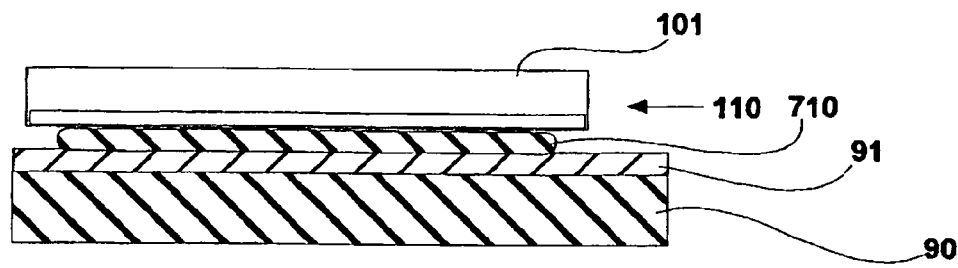

Subassembly 110 is bonded to common electrode 91 by first overlaying subassembly 110 onto perimeter seal ring 710 at a temperature of 150° C. and then applying sufficient pressure to backing resist 101 and substrate 90 to create a hermetic seal at seal ring 710 as shown in FIG. 11.

Figure 12:
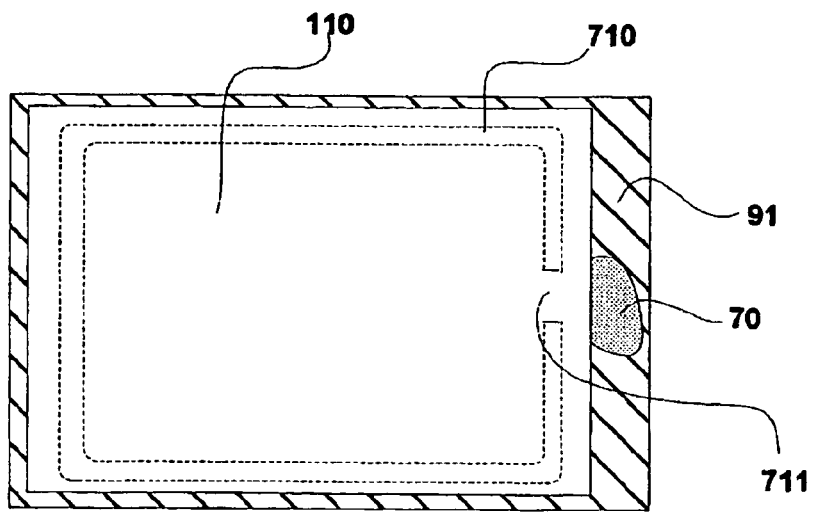
Figure 13:
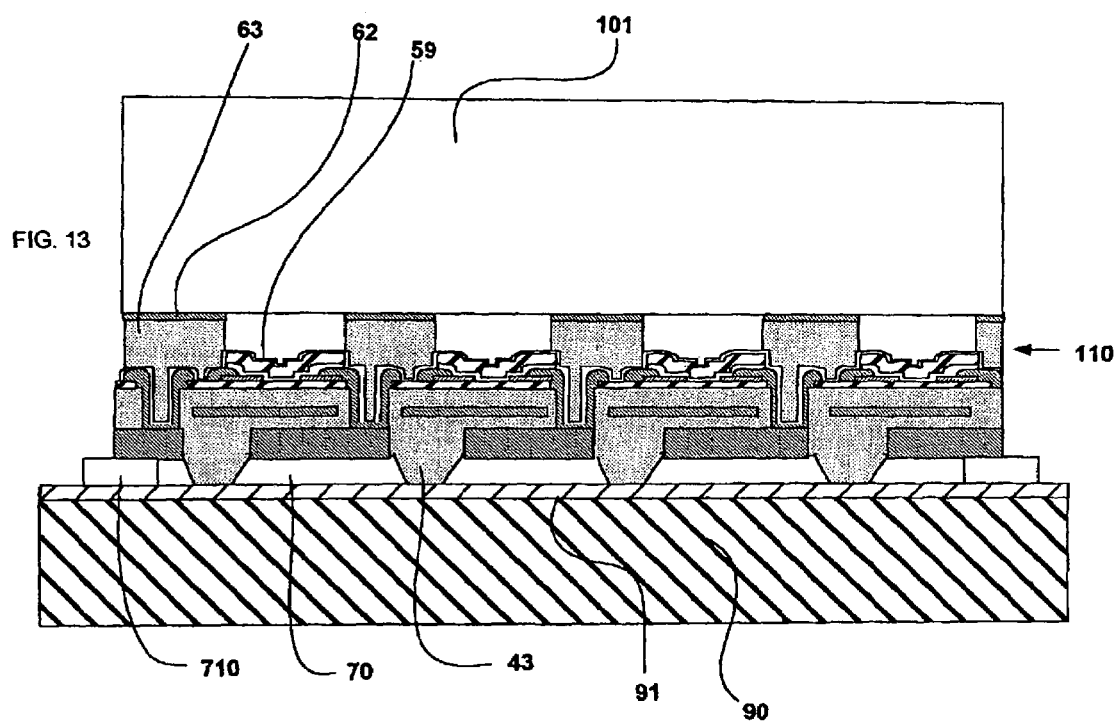

The liquid-crystal material for liquid-crystal cells 202 is introduced into the cavity formed by subassembly 110 and electrode 91 by way of seal ring gap 711 as shown in FIG. 12. After filling, sufficient pressure is applied to backing resist 101 to remove excess liquid-crystal material by expelling through gap 711. Flexible subassembly 110 conforms to the contour of electrode 91 overlying substrate 90 so that spacing elements 43 make contact to electrode 91 as shown in FIG. 13. Gap 711 is sealed by conventional means using UV-cured adhesive supplied by Norland Products.

Resist 101, which has not been exposed to actinic light, is removed by spray developing in a Riston developer. Liquid-crystal cells 202 are hermetically sealed in the cavity formed by subassembly 110 and electrode 91, and are protected from the spray developing solution. Exposed features 59, 62, and 63 are also not affected by spray developing.

Figure 14:
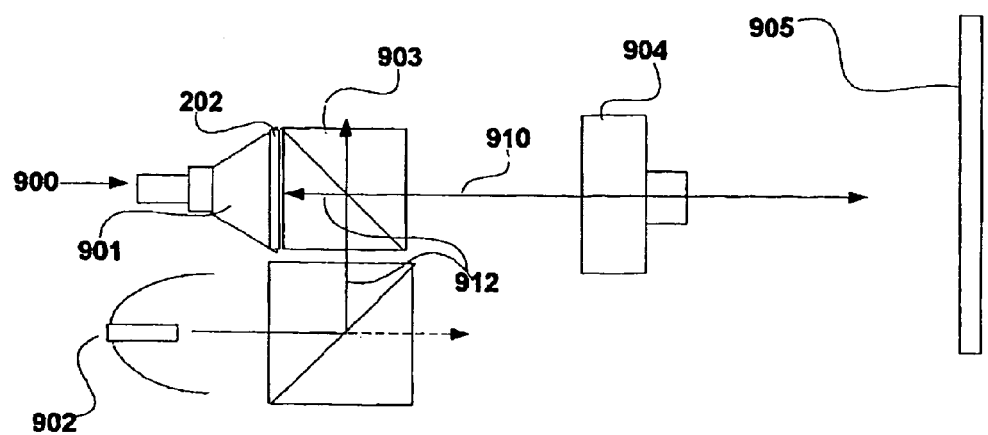
FIGS. 14 and 15 are schematic views of projection systems that employ the light modulator of FIGS. 1a and 1b.

Referring to FIG. 14, liquid-crystal cells 202, active matrix 201, and flexible membrane 200, spaced away from electrode 91 overlying transparent substrate 90, together with electron-beam guns 400 and 500, packaged in a suitable vacuum envelope 901, form an electron-beam-addressed spatial light modulator 900.

White light constituted with light wavelengths in the visible spectrum, emitted from a lamp 902, is separated into wavelength passbands comprising the primary color (red, blue, and green) spectrum. A primary color passband is polarized into a first polarization state 912 and a second polarization state 910 by means of a polarization beam splitter 903 supplied by Optical Coating Laboratories Incorporated ("OCLI"). Light of a first polarization state 912 is directed to the array of reflective display electrodes 31 by transmission through transparent substrate 90, common electrode 91, and liquid-crystal cells 202. The liquid-crystal molecules are aligned by the alignment coating so as to transmit light of first polarization state 912 when display electrodes 31 are equipotential with common electrodes 91. Light of first polarization state 912 is reflected from display electrodes 31, and directed to polarizing beam splitter 903 whereby it is reflected away from a projection lens 904, and no image is projected to a viewing screen 905.

Image information generated by a video source is represented as a pattern of electron beam-induced charges on gate delta coatings 59 overlying active matrix 201. TFT current charges the array of display electrodes 31 to voltages corresponding to the charge pattern on the TFT array. The potential differences between display electrodes 31 and common electrode 91 result in electric field-induced rotation of the liquid-crystal molecules so as to align to the field direction. The maximum electric field results in molecular orientation orthogonal to the zero-field orientation, whereby light of first polarization state 912 is rotated relative to second polarization state 910. Light of second polarization state 910 is reflected from display electrodes 31, and relayed to beam splitter 903, whereby it is transmitted to projection lens 904 and projected onto viewing screen 905 as an image of maximum brightness.

An electric field across a liquid-crystal cell 202 of intermediate strength, between minimum and maximum, results in molecular rotation intermediate between orthogonal orientations to provide an image portion of intermediate brightness transmitted to viewing screen 905.

Figure 15:
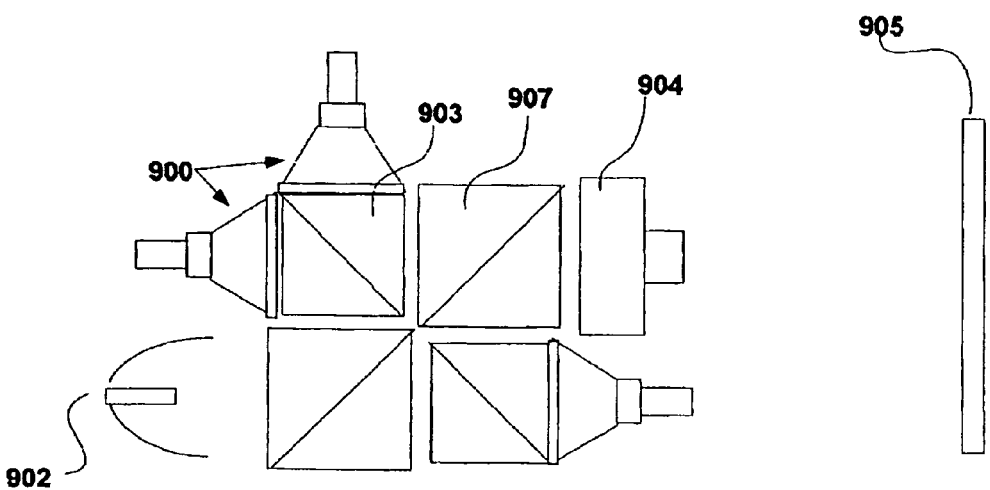

Full color image projection is typically obtained by combining three spatial light modulators into a projection engine 906 as shown in FIG. 15, whereby primary color projection light from each polarization beam splitter 903 is combined by a color combiner 907, supplied by OCLI, prior to projection lens 904.

While the invention has been described with reference to particular embodiments, this description is solely for the purpose of illustration and is not be construed as limiting the scope of the invention claimed below. For instance, liquid-crystal cells 202 may be formed with liquid crystal having different properties than that described above. Devices such as flat-panel emission arrays or photocathodes may be used in place of an electron-beam system to deposit electrical charge on active matrix 201. The light modulator of FIG. 1 can be used in a digital mode.

Each TFT 204 can be replaced with a floating-gate TFT configured the same as TFTs 204 except that a floating-gate electrode is situated between gate dielectric layer 58 and delta coating 59 above the semiconductor material between source/drain regions 51 and 52. The floating-gate electrode typically consists of electrically conductive or/and resistive material. Alternatively, delta coating 59 in the floating-gate TFT can be replaced with a dielectric layer which does not significantly emit secondary electrons, i.e., whose secondary electron emission coefficient δ is less than 1 for all values of average primary electron energy $V_{PE}$.

The present light modulator can be fabricated using compatible materials and manufacturing techniques other than those described above. Light passbands outside the visible passband can be modulated in accordance with the invention. Various modifications and applications may thus be made by those skilled in the art without departing from the true scope of the invention as defined in the appended claims.

We claim:

1. A structure comprising:
    a substrate;
    a plurality of liquid-crystal cells overlying the substrate above where the substrate is substantially transmissive of specified light;
    a like plurality of transistors respectively corresponding to the liquid-crystal cells, each transistor being in electrical communication with the corresponding liquid-crystal cell;
    an electron-beam system for selectively bombarding the transistors with electrons that cause each transistor to be selectively in (i) a non-conductive condition in which its channel-region electric field is substantially insufficient for conduction or (ii) a conductive condition in which its channel-region electric field is sufficient for at least partial conduction; and
    a control component which, during selected time periods when a transistor is in its conductive condition, provides that transistor with a control signal that results in the specified light having its polarization direction selectively rotated in the corresponding liquid-crystal cell.

2. A structure as in claim 1 wherein, during disablement periods, the control component causes all the transistors to be disabled regardless of whether each transistor is in its conductive or non-conductive condition.

3. A structure as in claim 1 wherein each liquid-crystal cell operates from (i) a low-rotation condition in which the polarization direction of the specified light in that cell rotates a first amount as little as zero to (ii) a high-rotation condition in which the polarization direction of the specified light in that cell rotates a second amount greater than the first amount.

4. A structure as in claim 3 wherein the transistors are electrically coupled together for receiving their control signals as substantially a common control signal from the control component.

5. A structure as in claim 4 wherein the common control signal is largely at (a) one of at least one low-impedance erase value that results in all the liquid-crystal cells being in their low-rotation conditions, (b) one of at least one low-impedance writing value that results in the polarization direction of the specified light being selectively rotated in each liquid-crystal cell for which the corresponding transistor is in its conductive condition, or (c) one of at least one high-impedance value that causes all the transistors to be disabled regardless of whether each transistor is in its conductive or non-conductive condition.

6. A structure as in claim 5 wherein one erase value of the common control signal lies approximately midway between two writing values of the common control signal, the control component alternating between the two writing values in generating the common control signal.

7. A structure as in claim 1 wherein the electron-beam system generates a scanning electron beam for selectively bombarding each transistor with electrons at a dosage and average energy which cause that transistor to be in its conductive condition.

8. A structure as in claim 7 wherein electrons provided by the scanning electron beam selectively cause each bombarded transistor to become electrically charged to at least a threshold level and thereby placed in that transistor's conductive condition.

9. A structure as in claim 8 wherein each transistor is in its conductive condition when it is positively charged.

10. A structure as in claim 7 wherein electrons of the scanning electron beam bombard selected ones of the transistors in accordance with an image pattern while all of the transistors are disabled.

11. A structure as in claim 10 wherein the electron-beam system modulates the current of the scanning electron beam in accordance with image gray levels for causing the conductive condition of each transistor to vary between a low-field condition and a high-field condition such that the polarization direction of the specified light in the corresponding liquid-crystal cell is rotated in a corresponding manner.

12. A structure as in claim 7 wherein the electron-beam system generates an additional electron beam for largely simultaneously bombarding all the transistors during selected bombardment time periods with electrons at a dosage and average energy which cause all the transistors to be in their conductive conditions.

13. A structure as in claim 12 wherein electrons of the additional electron beam simultaneously bombard all of the transistors during other bombardment time periods with electrons at a dosage and average energy which cause all of the transistors to be in their non-conductive conditions.

14. A structure as in claim 13 wherein the average electron energy is greater during bombardment of the transistors for causing them to be in their conductive conditions than for causing them to be in their non-conductive conditions.

15. A structure as in claim 7 wherein the electron-beam system generates an additional electron beam for largely simultaneously bombarding selected ones of the transistors during selected bombardment time periods with electrons at a dosage and average energy which cause each selected transistor to be in its non-conductive condition.

16. A structure as in claim 1 further including a flexible membrane situated between each transistor and the corresponding liquid-crystal cell.

17. A structure as in claim 16 wherein the membrane includes spacing elements situated between the liquid-crystal cells.

18. A structure as in claim 16 wherein the transistors electrically communicate with the liquid-crystal cells through openings in the membrane.

19. A structure as in claim 1 wherein each transistor comprises:
  first and second laterally separated source/drain regions, the first source/drain region being in electrical communication with the liquid-crystal cell corresponding to that transistor;
  a semiconductor layer having semiconductor material that extends between the source/drain regions; and
  a gate element situated above at least the semiconductor material between the source/drain regions for controlling the conductive and non-conductive conditions of that transistor.

20. A structure as in claim 19 wherein, upon being bombarded by electrons at a dosage and average energy suitable for causing the transistors to be in their conductive conditions, the gate element of each transistor is sufficiently electrically charged in a selected charging direction to induce the channel-region electric field for that transistor's conductive condition.

21. A structure as in claim 20 wherein, upon being bombarded by electrons at a dosage and average energy suitable for causing the transistors to be in their non-conductive conditions, the gate element of each transistor electrically charges sufficiently in a further charging direction opposite to the selected charging direction to induce the channel-region electric field for that transistor's non-conductive condition.

22. A structure as in claim 19 wherein the gate element of each transistor has an exposed surface which is bombarded by electrons from the electron-beam system and which has a secondary emission coefficient (a) less than 1 when electrons bombard that surface at an average energy below a crossover value and (b) greater than 1 when electrons bombard that surface at an average energy above the crossover value in a range extending to a higher energy value.

23. A structure as in claim 19 wherein the gate element of each transistor comprises:
  a first gate dielectric layer situated over at least the semiconductor material between the source/drain regions; and
  a second gate dielectric layer overlying the first gate dielectric layer, the second gate dielectric layer being capable of storing electrical charge and of having its electrical charge change upon being bombarded by electrons from the electron-beam system so as to selectively induce the channel-region electric field for the non-conductive or conductive condition of that transistor depending on the electron dosage and average energy.

24. A structure as in claim 23 wherein the second gate dielectric layer of each transistor has a secondary electron emission coefficient (a) less than 1 when electrons bombard the second gate dielectric layer at an average energy below a crossover value and (b) greater than 1 when electrons bombard the second gate dielectric layer at an average energy above the crossover value in a range extending to a higher energy value.

25. A structure as in claim 19 further including a like plurality of display electrodes respectively corresponding to the liquid-crystal cells and thereby respectively corresponding to the transistors, each display electrode electrically coupled to the first source/drain region of the corresponding transistor and electrically contacting the corresponding liquid-crystal cell along largely all of its upper surface.

26. A structure as in claim 25 wherein each display electrode is light reflective along where it contacts the upper surface of the corresponding liquid-crystal cell.

27. A structure as in claim 1 wherein:
  the structure is allocated into an array of pixels, each comprising multiple subpixels, the subpixels having an average subpixel width in a first lateral direction; and
  the electron-beam system generates an electron beam for scanning the subpixels, the electron beam having a beam width in the first lateral direction as the electron beam scans the subpixels in a second lateral direction generally perpendicular to the first lateral direction, the beam width in the first lateral direction being substantially at least twice the average subpixel width in the first lateral direction.

28. A structure as in claim 27 wherein:
  each subpixel comprises one of the transistors and the corresponding one of the liquid-crystal cells; and the transistors have, in the first lateral direction, an average transistor width largely constituting the average subpixel width in the first lateral direction.

29. A structure as in claim 1 wherein the specified light comprises visible light.

30. A structure as in claim 29 wherein the visible light comprises color light.

* * * * *